United States Patent
Edmonds et al.

(10) Patent No.: US 9,791,603 B2
(45) Date of Patent: Oct. 17, 2017

(54) OPTICAL STACK COMPRISING ADHESIVE

(75) Inventors: William F. Edmonds, Minneapolis, MN (US); Brandt K. Carter, Woodbury, MN (US); Jason S. Petaja, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 723 days.

(21) Appl. No.: 14/005,912

(22) PCT Filed: Mar. 26, 2012

(86) PCT No.: PCT/US2012/030510
§ 371 (c)(1),
(2), (4) Date: Sep. 18, 2013

(87) PCT Pub. No.: WO2012/138495
PCT Pub. Date: Oct. 11, 2012

(65) Prior Publication Data
US 2014/0016208 A1    Jan. 16, 2014

Related U.S. Application Data
(60) Provisional application No. 61/471,956, filed on Apr. 5, 2011, provisional application No. 61/471,661, filed on Apr. 4, 2011.

(51) Int. Cl.
*G02B 27/10* (2006.01)
*G02B 27/12* (2006.01)
(Continued)

(52) U.S. Cl.
CPC .......... *G02B 5/045* (2013.01); *C09J 7/0207* (2013.01); *C09J 133/08* (2013.01); *C09J 151/06* (2013.01); *C08L 2205/04* (2013.01)

(58) Field of Classification Search
CPC .... G02B 5/045; G02B 27/145; G02B 3/0056; G02B 6/001; G02B 6/4298; G02B 27/144;
(Continued)

(56) References Cited

U.S. PATENT DOCUMENTS

| | | | |
|---|---|---|---|
| 5,086,086 A | 2/1992 | Brown-Wensley | |
| 5,175,030 A | 12/1992 | Lu | |

(Continued)

FOREIGN PATENT DOCUMENTS

| | | |
|---|---|---|
| EP | 2226371 | 9/2010 |
| JP | 2008-174648 | 7/2008 |

(Continued)

OTHER PUBLICATIONS

International Search Report for PCT International Application No. PCT/US2012/030510, Mailed on Jun. 21, 2012, 4 pages.

*Primary Examiner* — Dawayne A Pinkney
(74) *Attorney, Agent, or Firm* — Carolyn A. Fischer

(57) ABSTRACT

Presently described are optical stacks comprising a first optical film comprising a plurality of structures comprising an optically active portion designed primarily to provide optical gain and optionally an optically in-active bonding portion disposed on a first surface bonded to a second optical film with a light-transmissive adhesive layer such that a portion of the structures penetrate the adhesive layer and a separation is provided between the adhesive layer and the first surface. In one embodiment, the optical stacks exhibit a combination of high peel strength and high retained brightness, particularly after aging. The adhesive layer preferably comprises an interpenetrating network of the reaction product of a polyacrylate component and a polymerizable monomer and the adhesive layer has an elastic modulus ranging from 100 to 2000 MPa at 25° C.

15 Claims, 9 Drawing Sheets

(51) Int. Cl.
  *B64D 47/06* (2006.01)
  *G02F 1/1335* (2006.01)
  *G02B 5/04* (2006.01)
  *C09J 133/08* (2006.01)
  *C09J 7/02* (2006.01)
  *C09J 151/06* (2006.01)

(58) Field of Classification Search
  CPC ..... G02B 27/0172; G02B 27/126; F21V 9/14; G02F 1/135; G02F 1/133615; G02F 2001/133616; G02F 1/133606
  USPC ....... 359/625, 618, 619, 629, 631, 640, 443, 359/454–455, 459; 362/26–27, 31, 19, 362/559–560; 349/19, 61–65
  See application file for complete search history.

(56) References Cited

U.S. PATENT DOCUMENTS

| | | | |
|---|---|---|---|
| 5,183,597 | A | 2/1993 | Lu |
| 5,252,694 | A | 10/1993 | Willett |
| 5,691,846 | A * | 11/1997 | Benson, Jr. ........... B29C 39/148 156/245 |
| 5,897,727 | A | 4/1999 | Staral |
| 6,024,455 | A | 2/2000 | O'Neill |
| 6,180,200 | B1 | 1/2001 | Ha |
| 6,760,157 | B1 | 7/2004 | Allen |
| 6,846,089 | B2 | 1/2005 | Stevenson |
| 7,526,164 | B2 | 4/2009 | Ouderkirk |
| 7,599,592 | B2 | 10/2009 | Denson, Jr. |
| 7,857,471 | B2 | 12/2010 | Ohta |
| 8,323,773 | B2 * | 12/2012 | Flanigan ................. B32B 3/30 428/156 |
| 2003/0017342 | A1 | 1/2003 | Nakamura |
| 2003/0104200 | A1 | 6/2003 | Holguin |
| 2003/0192638 | A1 | 10/2003 | Yang |
| 2003/0223131 | A1 | 12/2003 | Kuczynski |
| 2004/0228106 | A1 | 11/2004 | Stevenson |
| 2006/0134362 | A1 | 6/2006 | Lu |
| 2007/0223247 | A1 | 9/2007 | Lee |
| 2007/0284041 | A1 | 12/2007 | Iida |
| 2008/0137346 | A1 | 6/2008 | Ohta |
| 2008/0253929 | A1 | 10/2008 | Park |
| 2009/0041553 | A1 | 2/2009 | Burke |
| 2009/0117378 | A1 | 5/2009 | Hu |
| 2009/0161058 | A1 | 6/2009 | Sherman |
| 2010/0043966 | A1 | 2/2010 | Dunn |
| 2010/0263782 | A1 | 10/2010 | Husemann |
| 2010/0297406 | A1 | 11/2010 | Schaffer |
| 2011/0026118 | A1 | 2/2011 | Seesselberg |

FOREIGN PATENT DOCUMENTS

| | | |
|---|---|---|
| TW | I339279 | 3/2011 |
| WO | WO 03/040250 | 5/2003 |
| WO | WO 2004/104679 | 12/2004 |
| WO | WO 2006/088930 | 8/2006 |
| WO | WO 2008-024698 | 2/2008 |
| WO | WO 2008-047855 | 4/2008 |
| WO | WO 2011-130144 | 10/2011 |
| WO | WO 2011-130151 | 10/2011 |
| WO | WO 2011-130155 | 10/2013 |

* cited by examiner

OPTICAL STACK COMPRISING ADHESIVE

CROSS REFERENCE TO RELATED APPLICATIONS

This application is a national stage filing under 35 U.S.C. 371 of PCT/US2012/030510, filed Mar. 26, 2012, which claims priority to Provisional Application Nos. 61/471,956, filed Apr. 5, 2011, and 61/471,661 filed Apr. 4, 2011, the disclosures of which is incorporated by reference in their entirety herein.

BACKGROUND

Various optical adhesives, suitable for use in bonding optical articles or components have been described. Optical film stacks that have been bonded with an optical adhesive have also been described. Industry would find advantage in optical stacks and methods of bonding having improved properties.

SUMMARY

In one embodiment, optical stacks are described having a combination of high peel strength and high retained brightness, particularly after aging.

The optical stack comprises a first optical film comprising a plurality of structures comprising an optically active portion designed primarily to provide optical gain and optionally an optically in-active bonding portion disposed on a first surface. The first optical film is bonded to a second optical film with a light-transmissive adhesive layer such that a portion of the structures penetrate the adhesive layer and a separation is provided between the adhesive layer and the first surface. The peel strength of the optical stack is at least 50 grams force/inch. The optical stack exhibits a decrease in optical gain of no greater than 5% when the optical stack is conditioned at 65° C. and 95% relative humidity for 200 hours.

The low decrease in optical gain after aging is surmised to be attributed to little or no change of structure penetration into the adhesive layer after aging. This feature is beneficial for bonding various structures, regardless of whether the structures are designed primarily to provide optical gain.

In another embodiment, the optical stack comprises a first optical film comprising a plurality of structures disposed on a first surface bonded to a second optical film with a light-transmissive adhesive layer such that a portion of the structures penetrate the adhesive layer defining an average penetration and a separation is provided between the adhesive layer and the first surface. The peel strength of the optical stack is at least 50 grams force/inch. The penetration increases by no more than 50% when the optical stack is conditioned at 65° C. and 95% relative humidity for 200 hours.

The retained brightness and little or no change in penetration is preferably provided by certain cured adhesive layers.

In another embodiment, the optical stack comprises a first optical film comprising a plurality of structures disposed on a first surface bonded to a second optical film with a light-transmissive adhesive layer such that a portion of the structures penetrate the adhesive layer providing a separation between the adhesive layer and the first surface, wherein the adhesive layer comprises an interpenetrating network of the reaction product of a polyacrylate and a polymerizable monomer, the adhesive has an elastic modulus ranging from 100 to 2000 MPa at 25° C.

Also described are methods of making an optical construction such as an adhesively bonded stack of optical films. In one embodiment, the method comprises providing a protruding structure on a first surface, applying a layer of an adhesive composition to a substrate, contacting the protruding structure with the substrate such that the structure partially penetrates the adhesive forming a separation between the adhesive layer and the first surface; and curing the adhesive composition. The adhesive composition preferably comprises a polyacrylate and a monomer having functional group wherein the molecular weight of the monomer is greater than 100 g/mole per functional group.

Also described is an optical assembly, such as an intermediate construction of an optical stack. The optical assembly comprises a protruding structure on a first surface wherein a portion of the structure comprises an adhesive composition comprising a polyacrylate and a monomer comprising functional groups wherein the molecular weight of the monomer is less than 150 g/mole per functional group.

In each of these embodiments, at least a portion of the first optical film or structures preferably comprise an optically non-active bonding portion that penetrates the adhesive layer. In such embodiments, the optically active structures or portion thereof do not penetrate the adhesive layer.

In each of these embodiments, the adhesive may be characterized by any or combination of various attributes described herein. In one embodiment, the adhesive comprises about 35 wt-% to about 75 wt-% polyacrylate. In another embodiment, the polyacrylate is a pressure sensitive adhesive. In another embodiment, the polyacrylate comprises monomeric repeat units comprising branched C4-C12 alkyl groups, such as isooctyl. In one embodiment, the polyacrylate comprises repeat units derived from acrylic acid. In one embodiment, the polymerizable monomer is an epoxy component and the adhesive composition further comprises a photoactivated cationic initiator. In another embodiment, the polymerizable monomer comprises at least three (meth)acrylate groups and the adhesive composition further comprises a free-radical photoinitiator. In yet another embodiment, the adhesive comprises a (e.g. light transmissive) filler such that the adhesive has a haze ranging from about 2% to 30%.

BRIEF DESCRIPTION OF DRAWINGS

The invention may be more completely understood and appreciated in consideration of the following detailed description of various embodiments of the invention in connection with the accompanying drawings, in which.

DETAILED DESCRIPTION OF PREFERRED EMBODIMENTS

The present invention generally relates to an optical component having a protrusion such as an optically active structure of a light directing film that has a plurality of unitary discrete structures for directing and/or recycling light. The light directing film can bond to a surface, such as a major surface of an optical film or glass, via an optical adhesive layer, where the unitary discrete structures partially penetrate into the optical adhesive layer with high peel strength. The structures exhibit no or very little change in penetration into the optical adhesive initially and after aging, which can cause a loss in optical properties, such as optical gain or effective optical transmission.

The structures comprise an optically active portion designed primarily to provide optical gain. Various optical films comprising a plurality of structures are known. One favored type of structure is a prism microstructure.

In some embodiments, the entire structure (e.g. microstructured surface) is optically active. In favored embodiments, at least a portion of the first optical film or structures comprise a bonding portion. The bonding portion penetrates the adhesive layer. In favored embodiments, the optically active portions of the structures do not penetrate the adhesive layer.

One favored class of illustrative optical films that comprise an optically non-active bonding portion are described in WO2011/130155; WO2011/130144; and WO2011/130151; incorporated herein by reference.

Figure 1:
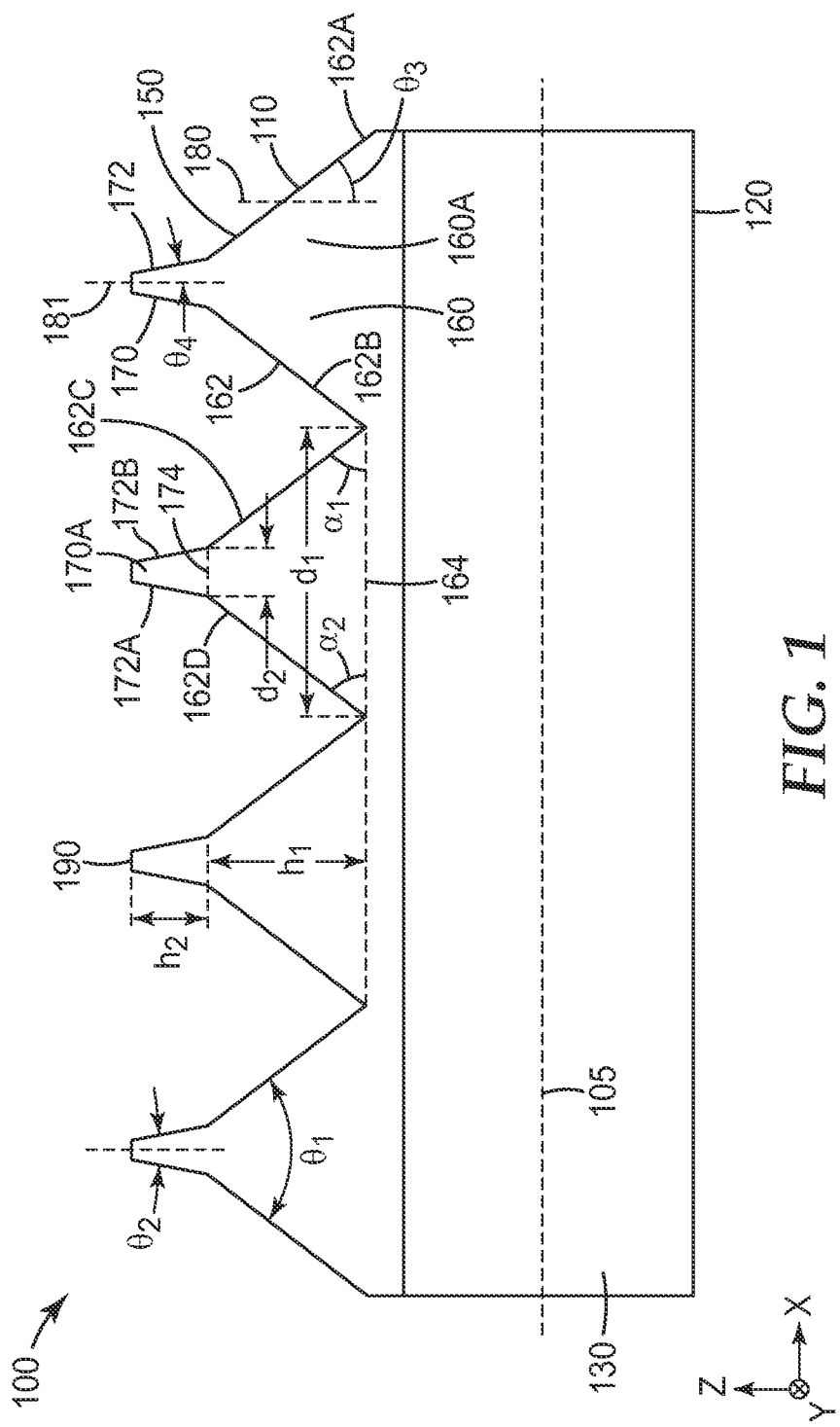
FIG. 1 is a schematic side-view of a light directing film.

FIG. 1 a schematic side-view of a light directing film 100 that includes a first structured major surface 110 and an opposing second major surface 120. First structured major surface 110 includes a plurality of unitary discrete structures 150. Each unitary discrete structure 150 includes an upper portion or bonding portion 170 and a lower portion or light directing portion 160. As used herein, a unitary structure refers to a structure that is a single unit with no interior or internal physical or detectable interfaces between the different portions or segments of the structure. In other words, a unitary structure does not include any interfaces, such as a sharp interface, a gradient interface, or a distributed interface, within the interior of the structure. In some cases, a unitary structure is made of the same material composition meaning that different locations or portions within the structure have the same material composition and the same index of refraction. In some cases, a unitary structure can have a non-uniform material composition or index of refraction distribution. For example, in some cases, a unitary structure can have a gradient refractive index distribution along, for example, the thickness direction of the unitary structure.

For example, each unitary discrete structure 150 includes an upper portion 170 and a lower portion 160 that form a single unit without a physical or detectable interface between the upper and lower portions. In some cases, the upper portions 170 and lower portion 160 can have the same material composition. In such cases, the structure is still considered to be non-unitary if an interface can be detected between the two portions. A unitary structure is typically made or fabricated in a single step, meaning that the process of fabricating the unitary structure cannot reasonably be divided into multiple or separate steps. In some cases, however, a unitary structure can be made or fabricated in two or more steps. A non-unitary or composite structure is typically made in multiple steps.

Unitary discrete structures 150 can have any shape, such as any regular or irregular shape, that may be desirable in an application. For example, in some cases, unitary discrete structures 150 can be or include a three-dimensional rectilinear body, such as a tetrahedron, a prism, or a pyramid, or a portion, or a combination, of such bodies, such as a frustum. In some cases, unitary discrete structures 150 can be or include a three-dimensional curvilinear body, such as a segment of a sphere, an asphere, an ellipsoid, a spheroid, a paraboloid, a cone, or a cylinder. In some cases, at least some of the unitary discrete structures 150 have prismatic profiles.

Unitary structures 150 are discrete, meaning that each unitary structure can be identified individually and as being separate from other similar unitary structures disposed on substrate 130. Each unitary discrete structure 150 includes light directing portion 160 that is primarily designed to direct light. Light directing portion 160 can also be designed to perform other functions, but the primary function of the light directing portion is to redirect light by, for example, refracting or reflecting, such as totally internally reflecting, light.

In general, light directing portion 160 can have any shape, such as any regular or irregular shape, that may be desirable in an application. For example, in some cases, light directing portion 160 can be or include a three-dimensional rectilinear body, such as a tetrahedron, a prism, or a pyramid, or a portion, or a combination, of such bodies, such as a frustum. In some cases, light directing portion 160 can be or include a three-dimensional curvilinear body, such as a segment of a sphere, an asphere, an ellipsoid, a spheroid, a paraboloid, a cone, or a cylinder. In some cases, light directing portions 160 can have a rotationally symmetric bullet-shape structure.

Light directing portion 160 includes a plurality of first side facets 162. For example, in the exemplary light directing film 100, light directing portion 160A includes a first side facet 162A and an opposing first side facet 162B. In general, light directing portion 160 can have two or more side facets.

The light directing portions of the unitary discrete structures disclosed herein are primarily designed to redirect light by, for example, refraction or reflection.

Figure 2:
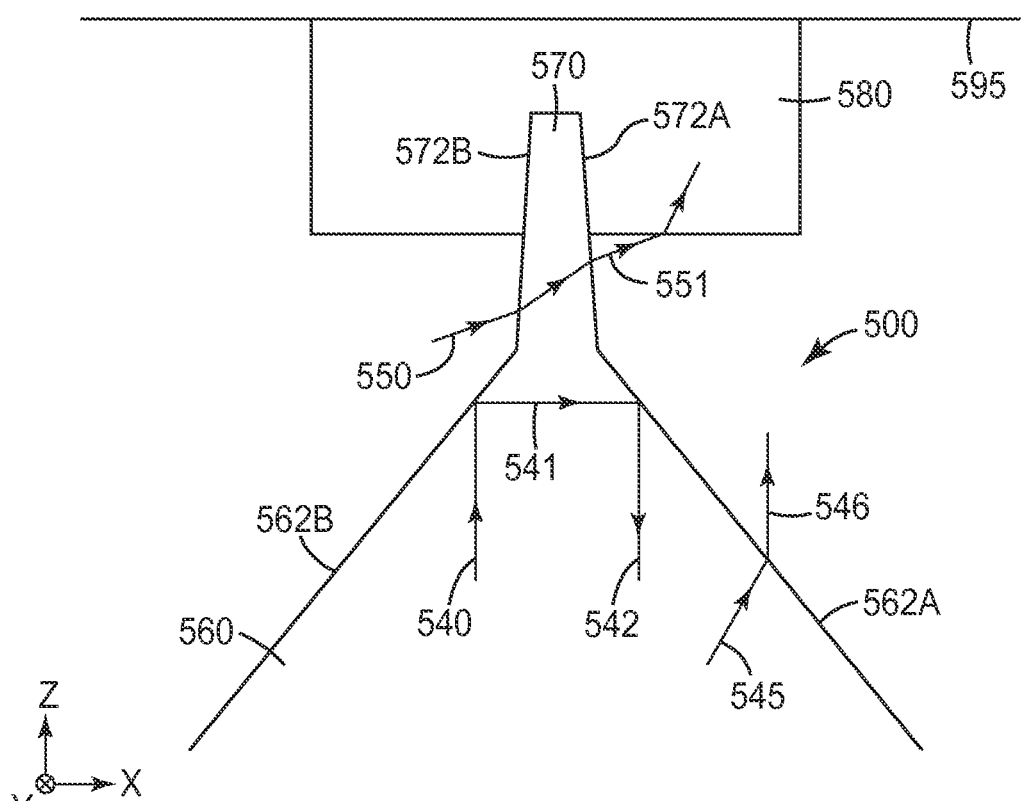
FIG. 2 is a schematic side-view of a unitary discrete structure partially penetrating an optical layer.

For example, FIG. 2 is a schematic side-view of a unitary discrete structure 500 that includes an upper or bonding portion 570 and a lower or light directing portion 560 that includes first side facets 562A and 562B and is primarily designed to direct light. For example, light directing portion 560 directs a light ray 540 as light ray 542 by first totally internally reflecting light ray 540 at side facet 562B as light ray 541 and then totally internally reflecting light ray 541 as light ray 542 at side facet 562A. As another example, light directing portion 560 directs light ray 545 as light ray 546 by refracting light ray 545 at side facet 562A.

Referring back to FIG. 1, each light directing portion 160 of unitary discrete structure 150 of light directing film 100 has a base that is the largest cross-section of the light directing portion that is parallel to the plane of the light directing film and is bound by the side facets of the light directing portion. For example, light directing portion 160 has a base 164 that is the largest cross-section of the light directing portion in a direction parallel to a plane 105 of the light directing film and is bound by side facets 162C and 162D. The exemplary light directing film 100 defines a plane 105 of the light directing film that is in the xy-plane.

Base 164 includes a minimum dimension $d_1$ that, in the exemplary light directing film 100, is along the x-direction.

In general, the minimum dimension of the base of a light directing portion can be any value or size that may be desirable in an application. For example, in some cases, the minimum dimension $d_1$ can be less than about 500 microns, or less than about 400 microns, or less than about 350 microns, or less than about 300 microns, or less than about 250 microns, or less than about 200 microns, or less than about 150 microns, or less than about 100 microns, or less than about 90 microns, or less than about 80 microns, or less than about 70 microns, or less than about 60 microns, or less than about 50 microns, or less than about 40 microns, or less than about 30 microns, or less than about 20 microns.

In general, the base of a light directing portion can have any shape, such as any regular or irregular shape, and any size minimum dimension that may be desirable in an application.

In general, a base of a light directing portion can be linear meaning that the dimension, such as the average dimension, of the base along the linear direction of the base is substantially larger than the dimension, such as the average dimension, of the base along the orthogonal direction. For example, in such cases, the ratio of the average dimension of the base along the linear direction to the average dimension of the base along the orthogonal direction is at least about 10, or at least about 50, or at least about 100, or at least about 500, or at least about 1000. In some cases, such as when the ratio of the average dimension of the base along the linear direction to the average dimension of the base along the orthogonal direction is at least about 10,000, the base and the light directing portion and unitary discrete structure associated with the base can be considered to have an infinite or unlimited extent or dimension along the linear direction and a finite or limited extent or dimension along the orthogonal direction. In some cases, the base of a light direction portion can be in the shape of a rectilinear figure, such as a polygon. In some cases, the polygon can be an irregular polygon, such as a rectangle, or a regular polygon, such as an equilateral triangle, a square, a regular hexagon, or a regular octagon. In some cases, the base can be a trapezium, a trapezoid, a parallelogram, a rhombus, or deltoid. In some cases, the base can be in the shape of a curvilinear figure, such as a circle, an ellipse, or a parabola.

Light directing portion 160 has a maximum height $h_1$ which is the maximum dimension or distance between base 164 and bonding portion 170 in a direction that is perpendicular to base 164 or plane 105.

In some cases, each first side facet of a light directing portion makes an angle with the plane of the light directing film that is in a range from about 30 degrees to about 60 degrees. For example, in light directing film 100, side facet 162C makes an angle $\alpha_1$ with plane 105 of the light directing film and side facet 162D makes an angle $\alpha_2$ with plane 105 of the light directing film, where each of $\alpha_1$ and $\alpha_2$ is in a range from about 30 degrees to about 60 degrees. In some cases, each first side facet of a light directing portion makes an angle with the plane of the light directing film that is in a range from about 35 degrees to about 55 degrees, or from about 40 degrees to about 50 degrees, or from about 41 degrees to about 49 degrees, or from about 42 degrees to about 48 degrees, or from about 43 degrees to about 47 degrees, or from about 44 degrees to about 46 degrees. In some cases, each first side facet of a light directing portion makes an angle with the plane of the light directing film that is about 45 degrees. For example, in some cases, each of angles $\alpha_1$ and $\alpha_2$ can be about 45 degrees.

As depicted in FIG. 1, in favored embodiments unitary discrete structure 150 can include bonding portion 170 that is primarily designed to bond the light directing film to a surface. In some cases, bonding portion 170 can also perform, or be designed to perform, other functions, but the primary function of the light directing portion is to bond the light directing film to a neighboring surface via, for example, an adhesive layer. With reference to FIG. 2, bonding portion 570 may be optically non-active or substantially less optically active than the light directing portion 560. Bonding portion 170 is disposed on light directing portion 160. Bonding portion 170 is also disposed on and between side facets 162. For example, bonding portion 170A is disposed on and between side facets 162C and 162D.

In general, bonding portion 170 can have any shape, such as any regular or irregular shape, that may be desirable in an application. For example, in some cases, bonding portion 170 can be or include a three-dimensional rectilinear body, such as a tetrahedron, a prism, or a pyramid, or a portion, or a combination, of such bodies, such as a frustum. In some cases, bonding portion 170 can be or include a three-dimensional curvilinear body, such as a segment of a sphere, an asphere, an ellipsoid, a spheroid, a paraboloid, a cone, or a cylinder.

Bonding portion 170 includes a plurality of side facets 172. For example, in the exemplary light directing film 100, bonding portion 170A includes a side facet 172A and an opposing side facet 172B. In general, bonding portion 170 can have two or more side facets.

The bonding portions of the unitary discrete structures disclosed herein are primarily designed to bond the light directing portions to a neighboring surface.

The bonding portions of the unitary discrete structures disclosed herein are primarily designed to bond the light directing portions to a neighboring surface. For example, referring to FIG. 2, unitary discrete structure 500 includes bonding portion 570 that includes side facets 572A and 572B and bonds or attaches light directing portion 560 to a neighboring surface 595 via an optical adhesive layer 580. The primary function of bonding portion 570 is to bond unitary discrete structure 500 or light directing portion 560 to surface 595. In some cases or applications, bonding portion 570 can also direct light. For example, bonding portion 570 can direct a light ray 550 as a light ray 551, but such light directing function is not the primary function of the bonding portion. Rather, the light directing function is a secondary function of the bonding portion.

The bonding portions and light directing portions of the unitary discrete structures disclosed herein have multiple or pluralities of side facets. In general, a side facet disclosed herein can have any shape, such as any regular or irregular shape, that may be desirable in an application. For example, in some cases, a side facet can be or include a planar portion.

Each bonding portion 170 of unitary discrete structure 150 of light directing film 100 has a base that is the largest cross-section of the bonding portion that is parallel to the plane of the light directing film and is bound by the side facets of the bonding portion. Base 174 is bound by side facets 172. For example bonding portion 170 has a base 174 that is the largest cross-section of the bonding portion that is parallel to plane 105 of the light directing film and is bound by side facets 172A and 172B of the bonding portion.

The base of the bonding portion 174 includes a minimum dimension $d_2$ that, in the exemplary light directing film 100, is along the x-direction. In general, a base of a bonding portion can have any shape, such as any regular or irregular shape, and any size minimum dimension that may be desirable in an application. In general, the base of a bonding portion can be linear meaning that the dimension, such as the average dimension, of the base along the linear direction of the base is substantially larger than the dimension, such as the average dimension, of the base along the orthogonal direction. For example, in such cases, the ratio of the average dimension of the base along the linear direction to the average dimension of the base along the orthogonal direction is at least about 10, or at least about 50, or at least about 100, or at least about 500, or at least about 1000. In some cases, such as when the ratio of the average dimension of the base along the linear direction to the average dimension of the base along the orthogonal direction is at least about 10,000, the base, the bonding portion and the unitary discrete structure associated with the base can be considered to have an infinite or unlimited extent or dimension along the linear direction and a finite or limited extent or dimension along the orthogonal direction. In some cases, the base of a bonding portion can be in the shape of a rectilinear figure, such as a polygon. In some cases, the polygon can be an irregular polygon, such as a rectangle, or a regular polygon, such as an equilateral triangle, a square, a regular hexagon, or a regular octagon. In some cases, the base can be a trapezium, a trapezoid, a parallelogram, a rhombus, or deltoid. In some cases, the base can be in the shape of a curvilinear figure, such as a circle, an ellipse, or a parabola.

Referring back to FIG. 1, bonding portion 170 has a maximum height $h_2$ which is the maximum dimension or distance between base 174 and the top of the bonding portion in a direction that is perpendicular to base 174 or plane 105 of the light directing film. In general, the height of the bonding portions disclosed herein can vary along one or more directions. In general, the height of the disclosed linear unitary discrete structures can remain constant or vary along the length of the unitary discrete structures. In some cases, each side facet of a bonding portion makes an angle with the plane of the light directing film that is greater than about 60 degrees. In some cases, each side facet of a bonding portion makes an angle with the plane of the light directing film that is greater than about 65 degrees, or greater than about 70 degrees, or greater than about 75 degrees, or greater than about 80 degrees, or greater than about 85 degrees.

In some cases, each unitary discrete structure in a light directing film disclosed herein includes a plurality of side facets, where the side facets that make an angle with the plane of the light directing film that is in a range from about 35 degrees to about 55 degrees, or from about 40 degrees to about 50 degrees, or from about 41 degrees to about 49 degrees, or from about 42 degrees to about 48 degrees, or from about 43 degrees to about 47 degrees, or from about 44 degrees to about 46 degrees, form or define the light directing portion of the unitary discrete structure, and the side facets that make an angle with the plane of the light directing film that is greater than about 60 degree, or greater than about 65 degrees, or greater than about 70 degrees, or greater than about 75 degrees, or greater than about 80 degrees, or greater than about 85 degrees, form or define the bonding portion of the unitary discrete structure.

In some cases, the minimum dimension of the base of the bonding portion of a unitary discrete structure is substantially less than the minimum dimension of the base of the light directing portion of the unitary discrete structure. For example, referring to FIG. 1, in some cases, the minimum dimension $d_2$ is substantially less than the minimum dimension $d_1$. For example, in such cases, the minimum dimension $d_2$ is less than about 20%, or less than about 18%, or less than about 16%, or less than about 14%, or less than about 12%, or less than about 10%, or less than about 9%, or less than about 8%, or less than about 7%, or less than about 6%, or less than about 5%, or less than about 4%, or less than about 3%, or less than about 2%, or less than about 1%, of the minimum dimension $d_1$.

In some cases, bonding portions 170 have aspect ratios that are greater than 1. For example, in some cases, the ratio of the maximum height $h_2$ of bonding portion 170 to the second minimum dimension $d_2$ of the bonding portion is greater than 1. For example, in such cases, the ratio $h_2/d_2$ is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

In other embodiments, the first optical film comprises a plurality of structures that lack bonding portions. In such embodiment, substantially the entire structure may be optically active.

Figure 3:
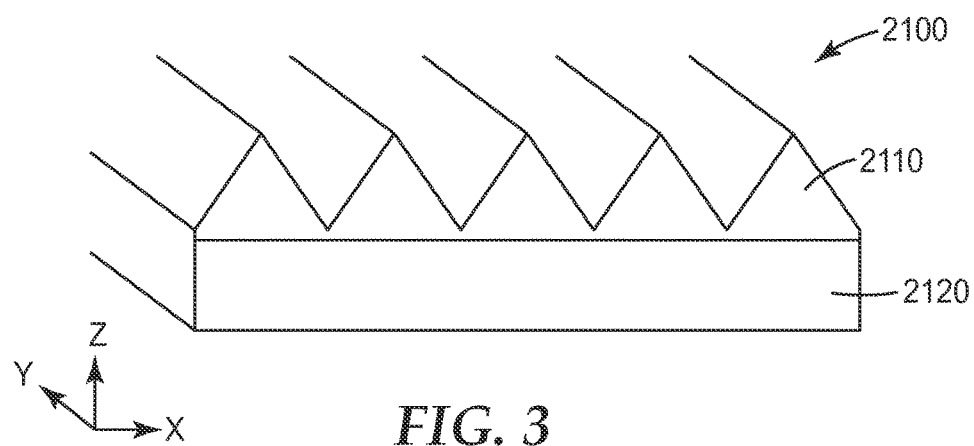
FIG. 3 is a schematic three-dimensional view of a light directing film.

For example, FIG. 3 is a schematic three dimensional view of a light directing film 2100 that includes a plurality of linear prismatic structures 2110 that are disposed on a substrate 2120 and extend linearly along the y-direction.

Figure 4:
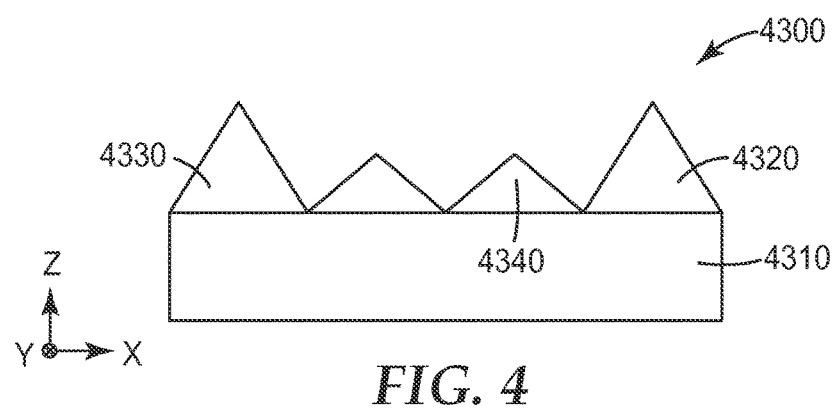
FIG. 4 is a schematic side-view of a light directing film.

In another example of a first optical film comprises a plurality of structures that lack bonding portions, FIG. 4 is another schematic three dimensional view of a light directing film 4300 that includes a plurality of linear prismatic structures (e.g. 4320, 4330, 4340). FIG. 4 differs from FIG. 3 in that the prismatic structures do not have the same height. Rather a portion of the prisms have a greater height than adjacent prisms. In this embodiments, the apex of the prismatic structures are not coplanar, such as in FIG. 4.

Unitary discrete structures (e.g. 150, 500, 4320) can have any index of refraction that may be desirable in an application. For example, in some cases, the index of refraction of the unitary discrete structures is in a range from about 1.4 to about 1.8, or from about 1.5 to about 1.8, or from about 1.5 to about 1.7. In some cases, the index of refraction of the unitary discrete structures is not less than about 1.5, or not less than about 1.55, or not less than about 1.6, or not less than about 1.65, or not less than about 1.7.

In general, the light directing portions can have multiple side facets. In some cases, such as in the case of linear unitary discrete structures, each light directing portion can include two opposing side facets.

Referring back to FIG. 1, opposing side facets 162 of light directing portions 160 define an included angle $\theta_1$ which is the angle between the two opposing side facets. In some cases, the included angle $\theta_1$ is in a range from about 60 degrees to about 120 degrees, or about 65 degrees to about 115 degrees, or about 70 degrees to about 110 degrees, or about 75 degrees to about 105 degrees, or about 80 degrees to about 100 degrees, or about 85 degrees to about 95 degrees. In some cases, the included angle $\theta_1$ is about 88 degrees, or about 89 degrees, or about 90 degrees, or about 91 degrees, or about 92 degrees.

Side facet 162A of light directing portion 160A makes an angle $\theta_3$ with a normal line 180 that is perpendicular to light directing film 100 or plane 105 of the light directing film. In some cases, the angle $\theta_3$ between a side facet of a light directing portion and the normal to the light directing film is in a range from about 30 degrees to about 60 degrees, or from about 35 degrees to about 55 degrees, or from about 40 degrees to about 50 degrees, or from about 42 degrees to about 48 degrees, or from about 43 degrees to about 47 degrees, or from about 44 degrees to about 46 degrees.

The various angles just described are also applicable to light directing films comprising unitary structures that lack bonding portions, such as FIGS. 3-4.

Opposing side facets 172 of bonding portion 170 define an included angle $\theta_2$ which is the angle between the two opposing side facets. In some cases, the included angle $\theta_2$ between two opposing side facets of a bonding portion is less than about 40 degrees, or less than about 35 degrees, or less than about 30 degrees, or less than about 25 degrees, or less than about 20 degrees, or less than about 15 degrees, or less than about 12 degrees, or less than about 10 degrees, or less than about 9 degrees, or less than about 8 degrees, or less than about 7 degrees, or less than about 6 degrees, or less than about 5 degrees, or less than about 4 degrees, or less than about 3 degrees, or less than about 2 degrees, or less than about 1 degree. In some cases, opposing side facets 172 of bonding portion 170 are parallel to each other. In such cases, the included angle between the two opposing side facets is zero.

Side facets 172 of bonding portions 170 make an angle $\theta_4$ with a normal line 181 that is perpendicular to light directing film 100 or plane 105 of the light directing film. In some cases, the angle $\theta_4$ between a side facet 172 of a bonding portion 170 and a normal 181 to the light directing film 100 is in a range from about zero degree to about 40 degrees, or from about zero degree to about 35 degrees, or from about zero degree to about 30 degrees, or from about zero degree to about 25 degrees, or from about zero degree to about 20 degrees, or from about zero degree to about 15 degrees, or from about zero degree to about 10 degrees, or from about zero degree to about 5 degrees.

In some cases, a side facet of the light directing portion of a unitary discrete structure 150 makes an angle $\theta_3$ with a normal, such as normal 180, to light directing film 100, and a side facet of the bonding portion of the same unitary discrete structure makes an angle $\theta_4$ with the normal, such as normal 180, to light directing film 100. In some cases, $\theta_4$ is less than $\theta_3$. In some cases, $\theta_4$ is less than $\theta_3$ by at least about 5 degrees, or about 10 degrees, or about 15 degrees, or about 20 degrees, or about 25 degrees, or about 30 degrees, or about 35 degrees, or about 40 degrees.

In some cases, the light directing portions of a light directing film can have substantially equal maximum heights. For example, light directing portions 160 can have substantially equal maximum heights $h_1$. In some cases, at least two light directing portions can have unequal maximum heights.

In some cases, the maximum height of a disclosed light directing portion is less than about 500 microns, or less than about 400 microns, or less than about 300 microns, or less than about 200 microns, or less than about 100 microns, or less than about 90 microns, or less than about 80 microns, or less than about 70 microns, or less than about 60 microns, or less than about 50 microns, or less than about 40 microns, or less than about 30 microns, or less than about 20 microns, or less than about 10 microns.

Referring back to FIG. 1, each bonding portion 170 includes a top surface 190 that connects the plurality of side facets 172 of the bonding portion. In some cases, top surface 190 can be substantially planar. In general, the top surface of a bonding portion can have any shape, such as any regular or irregular shape, or profile that may be desirable in an application. For example, in some cases, the top surface of a bonding portion is substantially piecewise planar.

In some cases, such as when the facets are planar, facets of a bonding portion of a light directing film that make an angle with the plane of the light directing film that is greater that about 60 degrees, or about 65 degrees, or about 70 degrees, or about 75 degrees, or about 80 degrees, or about 85 degrees, form the side facets of the bonding portion and facets of the bonding portion that make an angle with the plane of the light directing film that is less than about 60 degrees, or about 55 degrees, or about 50 degrees, or about 45 degrees, or about 40 degrees, or about 35 degrees, or about 30 degrees, or about 25 degrees, or about 20 degrees, or about 15 degrees, or about 10 degrees, form the top facets of the bonding portion.

In general, the unitary discrete structures in a light directing film may or may not have land portions. In some cases, at least some of the unitary discrete structures in a plurality of unitary discrete structures in a light directing film have symmetric cross-sectional profiles in a direction perpendicular to the light directing film, where by a symmetric unitary discrete structure it is meant that the light directing portion and the bonding portion of the unitary discrete structure have symmetric profiles. For example, a unitary discrete structure is considered to have a symmetric profile if the bonding and light directing portions of the unitary discrete structure have symmetric profiles, even if other parts, such as the land portion, of the unitary discrete structure have asymmetric profiles. In some cases, at least some of the unitary discrete structures in a plurality of unitary discrete structures in a light directing film have asymmetric cross-sectional profiles in a direction perpendicular to the light directing film.

The first optical film is bonded to a substrate (e.g. second optical film) with a light-transmissive adhesive layer, forming an optical stack.

Figure 5:
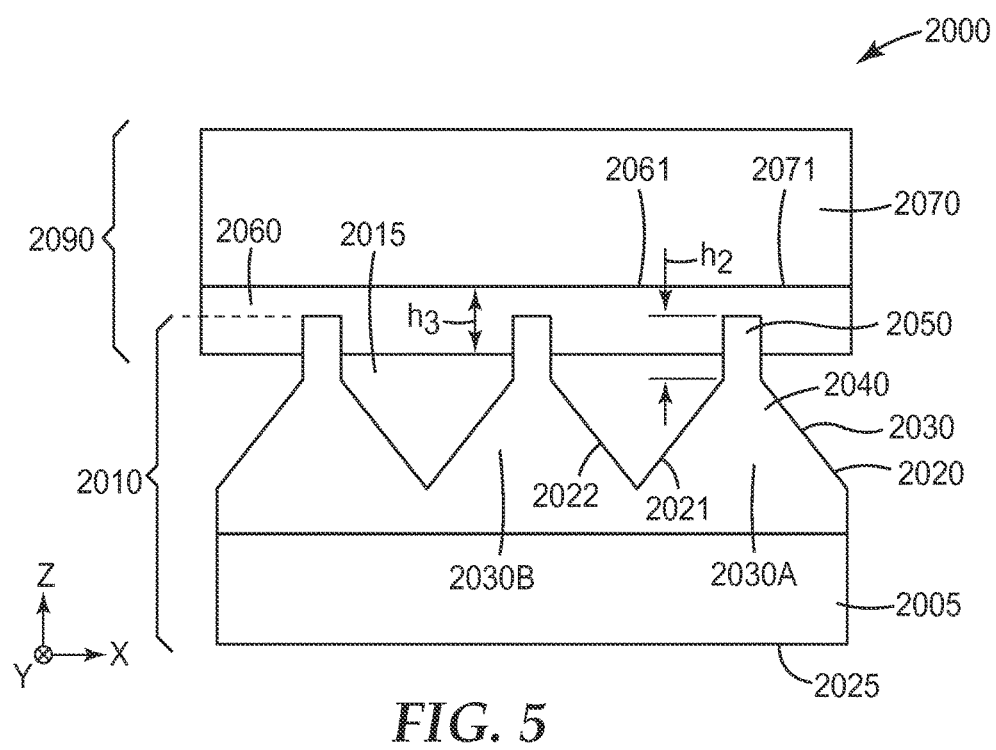
FIG. 5 is a schematic side-view of an optical stack.

FIG. 5 is a schematic side-view of an optical stack 2000 that includes an optical film 2090 that is disposed on a light directing film 2010, where light directing film 2010 can be any light directing film disclosed herein. Light directing film 2010 includes a first structured major surface 2020 and an opposing second major surface 2025. First structured major surface 2020 includes a plurality of unitary discrete structures 2030 that are disposed on a substrate 2005. Each of at least some unitary discrete structures include a light directing portion 2040 primarily for directing light and a bonding portion 2050 primarily for bonding the light directing film to optical film 2090. In some cases, such as in the case of the exemplary optical stack 2000, at least portions of at least some bonding portions 2050 of light directing film 2010 penetrate into optical film 2090 and at least portions of at least some light directing portions 2040 of light directing film 2010 do not penetrate into optical film 2090. In such cases, optical stack 2000 includes a plurality of unfilled voids 2015 between light directing film 2010 and optical film 2090, where the unfilled voids can contain air and/or a gas. In some cases, each of at least some of the plurality of unfilled voids 2015 substantially covers a region that is defined by optical film 2090 and portions of two or more adjacent unitary discrete structures 2030 that do not penetrate into the optical film and immediately surround the region. For example, in such cases, an unfilled void covers at least 50%, or at least 60%, or at least 70%, or at least 80%, or at least 90%, of a region that is defined by optical film 2090 and portions of two or more adjacent unitary discrete structures 2030 that do not penetrate into the optical film. For example, in the case of linear unitary discrete structures 2030, unfilled void 2015 substantially covers the region that is defined on the top by optical film 2090, on the right side by portion 2021 of linear unitary discrete structure 2030A that has not penetrated into the optical film, and on the left side by portion 2022 of linear unitary discrete structure 2030B that has not penetrated into the optical film.

Optical film 2090 includes an optical layer 2070 that is disposed on an optical adhesive layer 2060. The portions of bonding portions 2050 of light directing film 2010 that penetrate into the optical film penetrate into the optical adhesive layer. Optical adhesive layer 2060 attaches or bonds light directing film 2010 to optical layer 2070 or major surface 2071 of optical layer 2070 while substantially maintaining an air environment or surrounding for light directing portions 2040. In some cases, bonding portions 2050 have high aspect ratios which can result in strong bonding between optical film 2090 and light directing film 2010.

Bonding portions 2050 that penetrate into optical adhesive layer have an average maximum height $h_{2,avg}$ which is the average of the maximum heights $h_2$ of the individual bonding portions that have penetrated into the optical adhesive layer. In some cases, $h_{2,avg}$ is greater than the average thickness $h_3$ of optical adhesive layer 2060. For example, in such cases, $h_{2,avg}$ is greater than $h_3$ by at least 0.2 microns, or at least 0.3 microns, or at least 0.4 microns, or at least 0.5 microns, or at least 0.7 microns, or at least 1 micron, or at least 1.2 microns, or at least 1.5 microns, or at least 1.7 microns, or at least 2 microns.

When the average heights of the individual bonding portions is greater than the average thickness $h_3$ of the optical adhesive layer, the height of the bonding portions can create a physical separation between the optically active portions of the structures and the adhesive layer. This separation or air interface is maintained or substantially unchanged, provided that the adhesive composition does not flow or "creep" during the normal usage of the stack. Such usage can be simulated by use of aging tests at elevated temperatures, optionally in combination with increased humidity.

Alternatively, when the average heights of the individual bonding portions is less than the average thickness $h_3$ of the optical adhesive layer, the depth of penetration and maintaining such penetration during the normal usage of the stack provides the separation between the optically active portions of the structures and the adhesive layer.

In one embodiment, the optical adhesive layer has an average thickness $h_3$ of about 3 to 6 microns; and the bonding portions have an average maximum height $h_{2,avg}$ of about 4 microns.

In general, a substrate, (e.g. 130, 2005, 2120, 4310), such as optical film substrate 2070, can include any optical layer and provide any function that may be desirable in an application. For example, in some cases, the substrate may primarily provide support for other layers. As another example, the disclosed substrate may polarize light by including, for example, a reflective or absorbing polarizer, diffuse light by including an optical diffuser, direct or redirect light by including a light directing film.

For example, in some cases, optical layer 2070 can be or include an absorbing polarizer. As another example, in some cases, optical film 2090 or optical layer 2070 can include a reflective polarizer. In some cases, the reflective polarizer can include a multilayer optical film wherein at least some of the layers are birefringent. In some cases, the reflective polarizer can include alternating layers, where at least one of the alternating layers includes a birefringent material. In some cases, the reflective polarizer can include a wire grid reflective polarizer, or a cholesteric reflective polarizer. In some cases, the reflective polarizer can be or include a fiber polarizer. In such cases, the reflective polarizer includes a plurality of substantially parallel fibers that form one or more layers of fibers embedded within a binder with at least one of the binder and the fibers including a birefringent material. The substantially parallel fibers define a transmission axis and a reflection axis. The fiber polarizer substantially transmits incident light that is polarized parallel to the transmission axis and substantially reflects incident light that is polarized parallel to the reflection axis. Examples of fiber polarizers are described in, for example, U.S. Pat. Nos. 7,599,592 and 7,526,164, the entireties of which are incorporated herein by reference.

As another example, optical layer 2070 can be or include a substrate for providing, for example, support to optical film 2090. For example, substrate 2070 can include a light-transmissive substrate made of glass and/or polymers such as polyethylene terepthalate (PET), polycarbonates, and acrylics. In some cases, the substrate can have multiple layers. In some cases, optical layer 2070 can be a glass layer in a liquid crystal panel.

The preferred thickness of the adhesive layer may vary depending of the composition of substrate 20170. For example, when the substrate comprises a skin layer such as polycarbonate, the thickness of the adhesive layer is preferably 2 to 4 microns greater than the average height of the bonding portion.

In favored embodiments, optical layer 2070 can be or include (e.g. a second) light directing film 2100 that include a plurality of linear prismatic structures, such as FIGS. 3-4. In such cases, unitary discrete structures 2030 of light directing film 2010 can also be linear structures that extend in a direction that is perpendicular to the linear direction of linear prismatic structures 2110. For embodiments wherein optical layer 2070 can be or includes a second light directing film that includes a plurality of linear prismatic structures, the primatic structures are generally present on surface 2072, i.e. the opposing surface of optical layer 2070 to the adhesive layer 2060. The prisms are typically positioned approximately orthogonal to the prismatic structures of the first optical film. Other relative orientations of the prisms are sometimes desirable.

Figure 6:
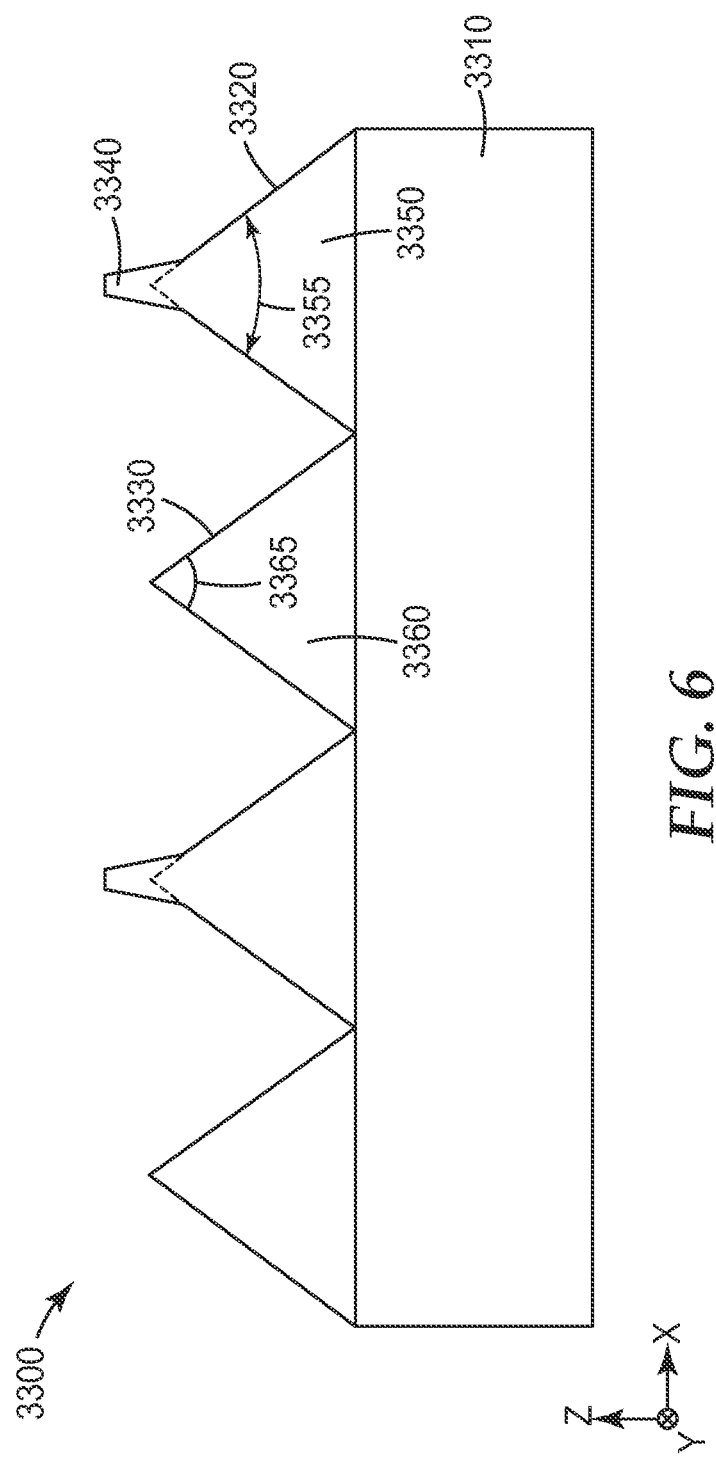
FIG. 6 is a schematic side-view of a light directing film.

In favored embodiments, bonding portions 2050 allow for secure attachment of light directing film 2010 to optical film 2090 or surface 2071 with no or very little loss in optical properties, such as brightness, both initially and after aging. In particular, the bonding portions have sufficiently large aspect ratios to provide sufficient exterior surface to enhance adhesion between the light directing film and the optical film. The bonding portions are also sufficiently narrow relative to the width of the light directing portions so that there is no or very little loss in the effective transmission of the light directing film and/or the optical stack. As used herein, effective transmission (ET), or optical gain, is the ratio of the luminance of an optical system, such as a display system, with the film in place in the optical system to the luminance of the optical system without the film in place. Although FIG. 5 depicts each of the discrete (e.g. prism) structures comprising a bonding portion 2050 such as a post extending from the apex of the (e.g. prism) structures, in other embodiments, some discrete structures in a light directing film can have bonding portions and light directing portions and some other discrete structures may have no bonding portions and may only have light directing portions. For example, FIG. 6 is a side-view schematic of a light directing film 3300 that includes a first plurality of unitary discrete structures 3320 and a second plurality of discrete structures 3330 disposed on a substrate 3310. Unitary discrete structures 3320 includes bonding portions 3340 designed primarily for bonding the light directing film to a surface and light directing portions 3350 designed primarily for directing light and have an included angle 3355. Discrete structures 3330 do not include bonding portions and only include light directing portions 3360 that are prismatic and have an apex angle 3365. In some cases, apex angle 3365 and included angle 3355 can be substantially equal and can, for example, be about 90 degrees. In general, unitary discrete structures can be any unitary discrete structure disclosed herein and discrete structures 3330 can be any discrete structure that is capable of directing light. In some cases, unitary discrete structures 3320 and discrete structures 3330 can be linear structures extending along the same direction, such as, for example, the y-direction. In the exemplary light directing film 3300, the rows of the discrete structures alternate between unitary discrete structures 3320 and discrete structures 3330. In general, each of unitary discrete structures 3320 and discrete structures 3330 can form any pattern or arrangement that may be desirable in an application. For example, discrete structures 3320 and 3330 can form a regular, such as periodic, or an irregular, such as a random, pattern.

Figure 7:
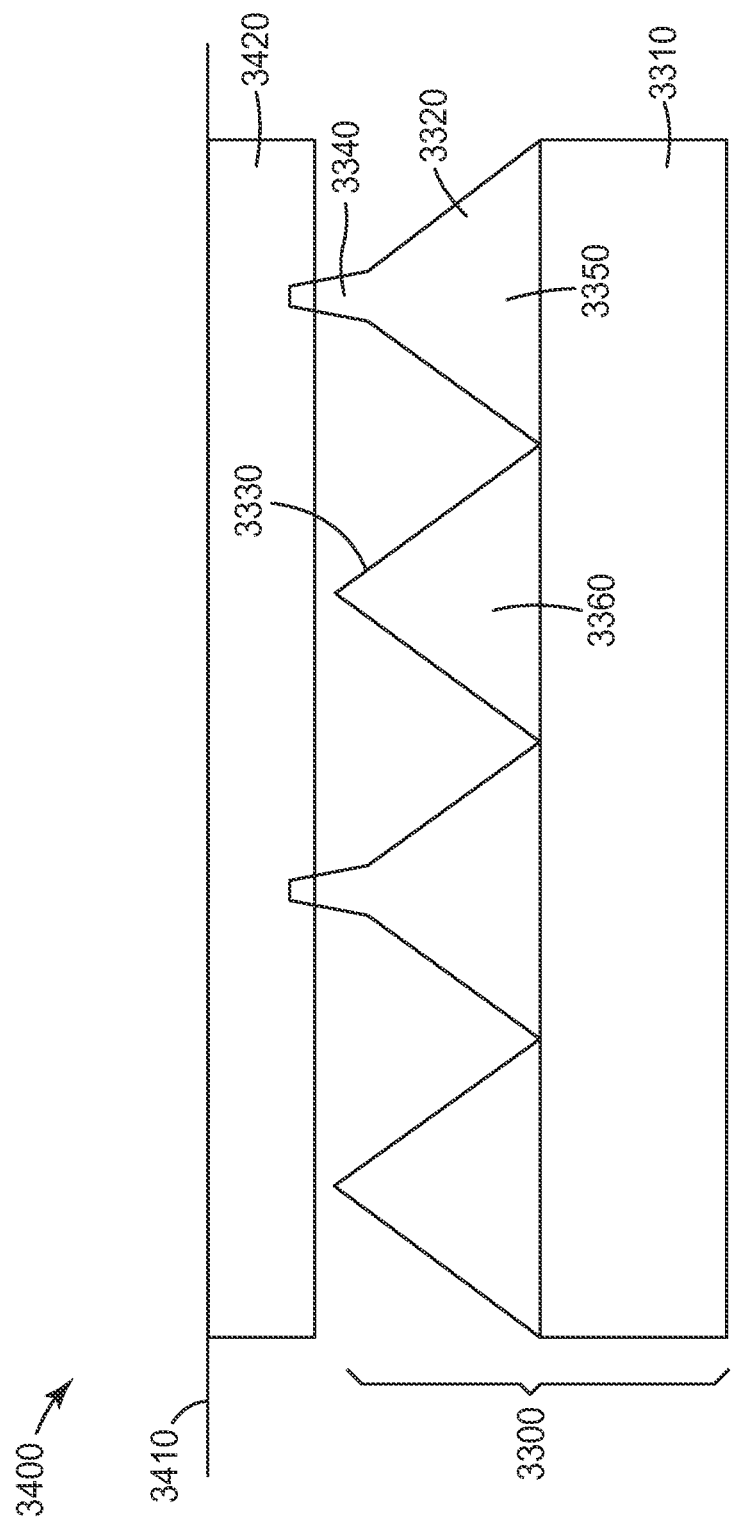
FIG. 7 is a schematic side-view of an optical stack.

FIG. 7 is a schematic side-view of an optical stack 3400 that includes light directing film 3300 laminated to a surface 3410 via an optical adhesive layer 3420. Bonding portions 3340 of unitary discrete structures 3320 at least partially penetrate into optical adhesive layer 3420 to provide secure attachment between light directing film 3300 and surface 3410. In the exemplary optical stack 3400, discrete structures 3330 do not penetrate into the optical adhesive layer, although, in some cases, portions of at least some discrete structures 3330 can penetrate into the optical adhesive layer. Light directing film 3300 includes sufficient number of bonding portions 3340 to provide sufficient adhesion between light directing film 3300 and surface 3410. At the same time, the number or density of bonding portions 3340 is sufficiently low so that there is no, or very little, loss in the optical gain or effective transmission of optical stack 3400.

Discrete (e.g. prism) structures wherein only a portion comprise bonding portion are generally favored for obtaining the highest peels in combination with the highest brightness, initially and after aging.

Bonding portions 2050 are designed primarily to provide sufficient adhesion between light directing film 2010 and optical film 2090 by sufficiently penetrating into the optical film. While providing sufficient adhesion between the two films, the bonding portions are sufficiently narrow so as to have no, or very little, effect on the effective transmission of light directing film 2010 or optical stack 2000. For example, in some cases, an optical stack that is similar to optical stack 2000 except that no bonding portion 2050 or unitary discrete structure 2030 penetrates into optical adhesive layer 2060 or optical film 2090, has the same effective transmission or an effective transmission that is only slightly larger than the effective transmission of optical stack 2000. In some cases, the effective transmission of optical stack 2000 prior to aging is not less or is less than by no more than about 20%, or about 15%, or about 10%, or about 9%, or about 8%, or about 7%, or about 6%, or about 5%, or about 4%, or about 3%, or about 2%, or about 1%, as compared to the same optical stack lacking adhesive and bonding portions.

However in other embodiments, the discrete (e.g. prism) structures lack a bonding portion 2050 such as a post extending from the apex of the (e.g. prism) structures. For example, the light redirecting film may comprise solely optically active structures, as depicted in previously described FIGS. 3 & 4. Although such optical stack constructions typically have lower gain due to portions of the (apex of the) optically active structure rendered optically inactive by being covered with adhesive, such constructions are still improved due to the improved peel strength in combination with high retained brightness or little to no change in structure penetration of the adhesive layer after aging.

In general, the peel strength to separate light redirecting film 2010 comprising optical adhesive layer 2060 from the substrate to which it is bonded, such as optical film 2090 is sufficiently large to provide secure adhesion so that optical stack 2000 can be handled as a single film or unit without bonding portions 2050 delaminating or separating from optical film 2090. In some cases, the initial peel strength (i.e. without aging at conditions of elevated temperature and humidity) of light redirecting film 2010 and optical adhesive layer 2060 is at least 30 g/inch.

The adhesive composition (e.g. of adhesive layer 2060) is selected such that the optical stack has improved adhesion, as measured by the peel strength. The initial peel is at least 50 grams/inch, or about 75 grams/inch, or about 100 grams/inch, and in some embodiments at least about 150 grams/inch, or about 175 grams/inch, or about 200 grams/inch. In some embodiments, the peel strength is no greater than 600, 700, or 800 grams/inch. Peel strengths approaching 1000 grams/inch generally result in tearing of the optical film or bonded substrate.

Additionally, the peel strength of the optical stack falls within the criteria just described after aging. Although, in some embodiments the peel strength may decrease with aging; the optical stack has improved peel strength even with such reduction due in part by the higher initial peel strength.

Figure 8:
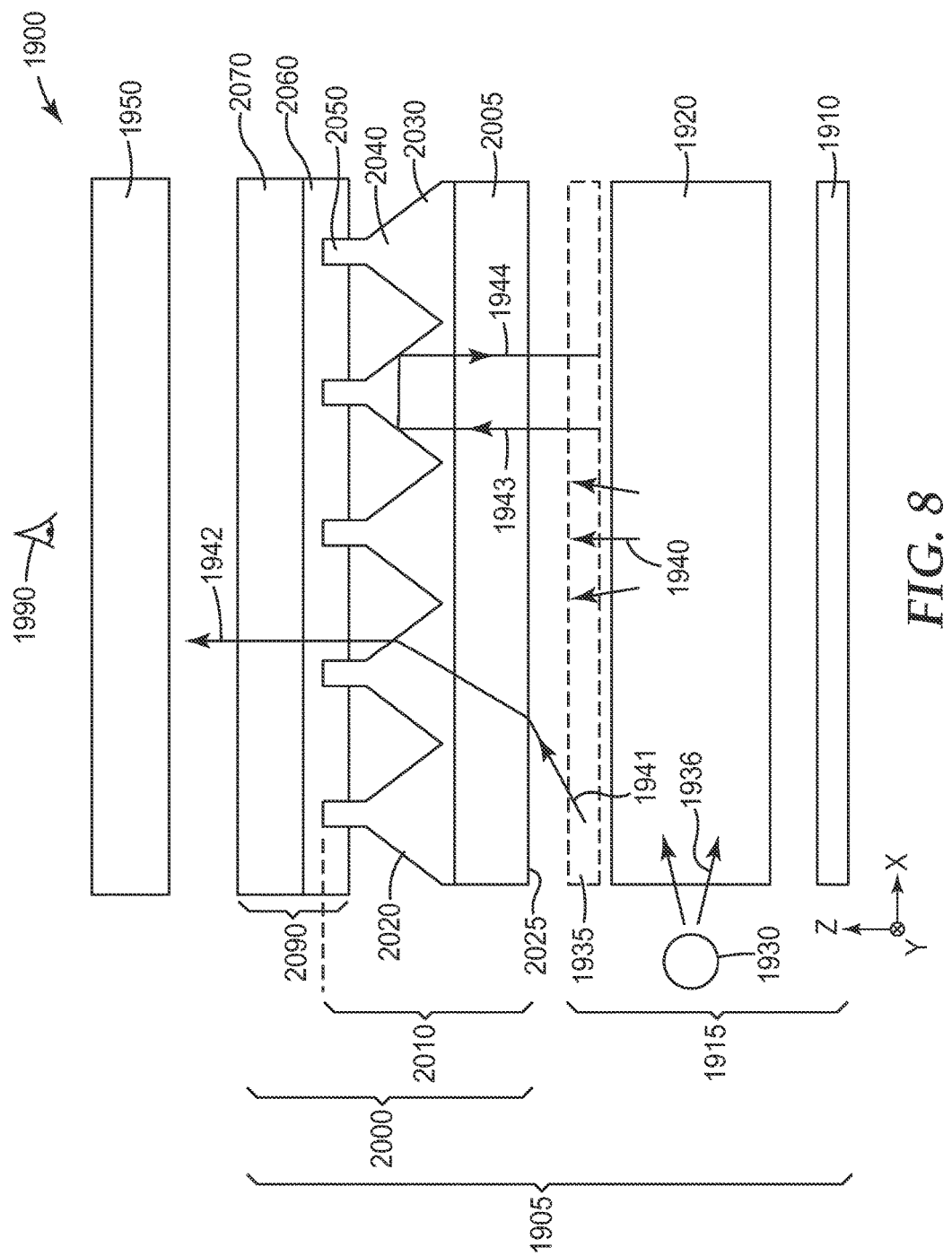
FIG. 8 is a schematic side-view of a display system.

In some cases, a light directing portion of a disclosed unitary discrete structure is designed to recycle light so that, for example, the brightness of an image viewed by a viewer is increased or enhanced. For example, FIG. 8 is a schematic side-view of a display system 1900 that includes an image forming panel 1950 that is capable of forming an image and displaying the image to a viewer 1990 and is disposed to receive light from an illumination system 1905. Illumination system 1905 includes optical stack 2000 disposed on a light source 1915 that includes a lightguide 1920; a lamp 1930 for emitting light 1936 that enters the lightguide, propagates within the lightguide by total internal reflection, and exits the lightguide as light 1940 towards the image forming panel; and a back reflector 1910 for redirecting light that is incident on the back reflector towards the image forming panel. Light directing portions 2040 are designed primarily to either redirect light that exits lightguide 1920 toward image forming panel 1950, or reflect light that exits the lightguide for recycling. For example, light directing portions 2040 redirect light 1941 that exits lightguide 1920 as light 1942 towards the image forming panel or the viewer. As another example, light directing portions 2040 receive light 1943 that exits the lightguide and totally internally reflect back the received light as light 1944 for recycling.

In general, image forming panel 1950 can be any type panel that is capable of forming and image and displaying the image to viewer 1990. In some cases, image forming panel 1950 can be or include a liquid crystal panel. In such cases, a liquid crystal image forming panel 1950 can include a layer of liquid crystal disposed between two panel plates such as glass plates, an upper light absorbing polarizer layer disposed above the liquid crystal layer and a lower absorbing polarizer disposed below the liquid crystal layer. The upper and lower light absorbing polarizers and the liquid crystal layer, in combination, control the transmission of light to viewer 1990. In some cases, image forming panel 1950 can be a monolithic image forming panel or a tiled image forming panel that includes a plurality of image forming tiles. In some cases, light source 1915 can be a monolithic light source or a tiled light source that includes a plurality of light source tiles. In some cases, display system 1900 includes a monolithic image forming panel 1950 and a tiled light source 1915. A tiled light source 1915 can include a plurality of independently controlled tiled lightguides 1920, where each lightguide can illuminate a different zone in a displayed image.

In some cases, display system 1900 or illumination system 1905 can include one or more optional layers 1935 that are disposed between optical stack 2000 and lightguide 1920. Exemplary optional layers 1935 include, light diffusing layers and polarization retardation layers.

In general, the disclosed light directing films include a first structured major surface that include a plurality of unitary discrete structures, and a second major surface that opposes the first structured major surface. In some cases, a disclosed light directing film is designed primarily to receive light from the second major surface side of the light directing film. For example, light directing film 2010 in FIG. 8, is designed primarily to receive light from second major surface 2025 and emit or transmit light from first structured major surface 2020.

Alternatively, a light directing portion of a disclosed unitary discrete structure is designed primarily to redirect, but not recycle, light. In general, the disclosed light directing films include a first structured major surface that include a plurality of unitary discrete structures, and a second major surface that opposes the first structured major surface. In some cases, a disclosed light directing film is designed primarily to receive light from the first structured major surface side of the light directing film.

In some cases, second major surface (for example 120 of FIG. 1) includes a plurality of structures to assist in, for example, diffusing light, hiding or masking defects such as dust particles or scratches, and/or reducing the visibility of an undesirable optical effect such as moiré.

Figure 9:
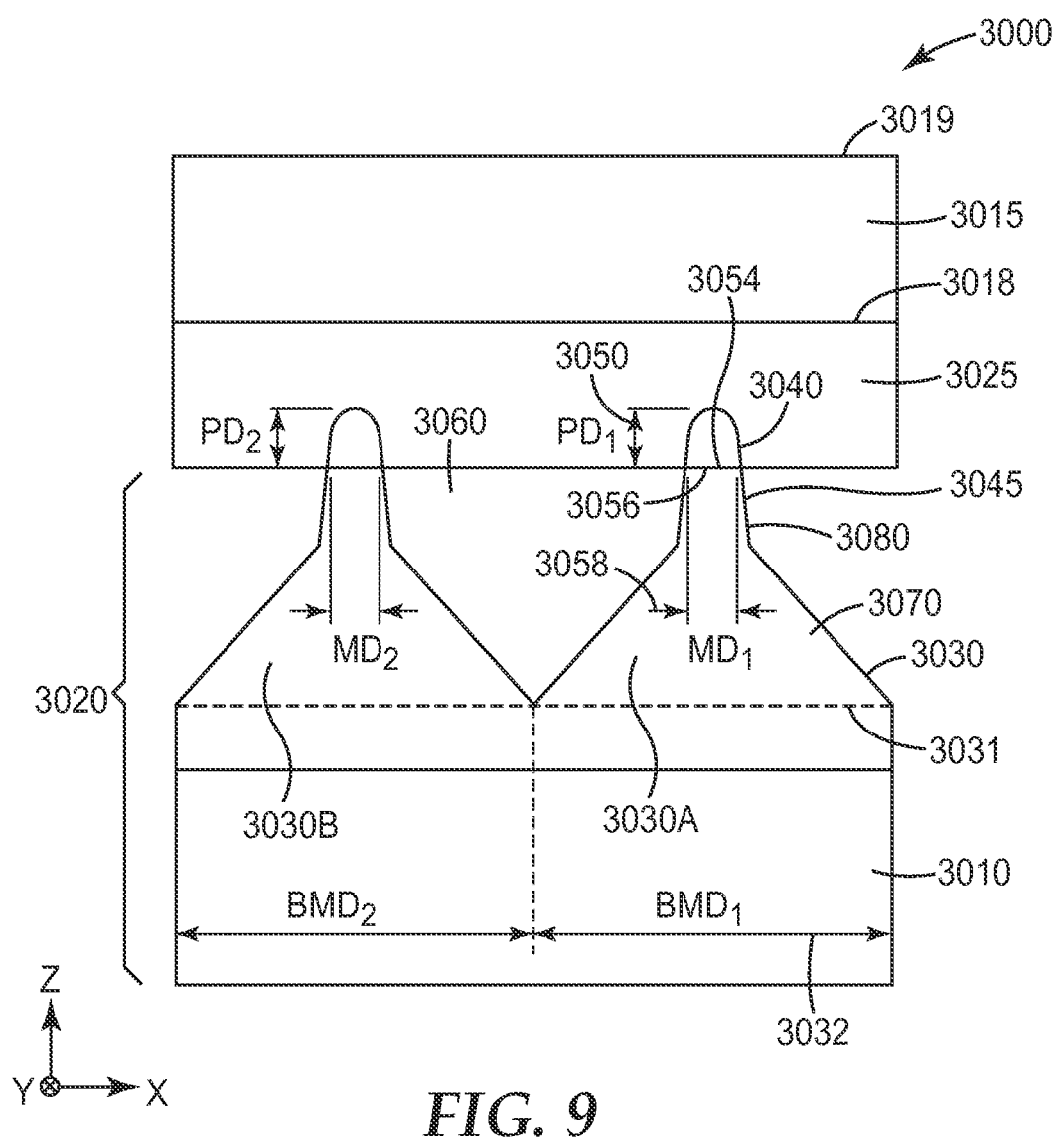
FIG. 9 is a schematic side-view of another optical stack.

FIG. 9 is a schematic side-view of an optical stack 3000 that includes a light directing film 3020 that includes a plurality of unitary discrete structures 3030 disposed on a first substrate 3010, a second substrate 3015 having a major surface 3018 facing the light directing film and an opposing major surface 3019 facing away from the light directing film, and an optical adhesive layer 3025 disposed between light directing film 3020 and second substrate 3015 for bonding or adhering the light directing film to surface 3018 of the second substrate.

Portion 3040 of each unitary discrete structure 3030 penetrates into optical adhesive layer 3025 and can be referred to as the penetrating portion 3040 of the unitary discrete structure. Portion 3045 of each unitary discrete structure 3030 does not penetrate into optical adhesive layer 3025 and can be referred to as the non-penetrating portion 3045 of the unitary discrete structure. Each penetrating unitary discrete structure defines a penetration depth 3050 which is the longest penetration distance normal to the optical stack (z-direction). For example, unitary discrete structure 3030A has a penetration depth $PD_1$ and unitary discrete structure 3030B has a penetration depth $PD_2$. Each unitary discrete structure also defines a penetration base 3054 at interface 3056 between penetrating portion 3040 and non-penetrating portion 3045 of the unitary discrete structure. Penetration base 3054 has a minimum penetration base dimension 3058 that, in some cases, can be the width of the penetration base along the x-axis. For example, unitary discrete structure 3030A has a minimum penetration base dimension $MD_1$ and unitary discrete structure 3030B has a minimum penetration base dimension $MD_2$. The plurality of unitary discrete structures 3030 has an average penetration depth and an average minimum penetration base dimension. For example, the unitary discrete structures 3030A and 3030B have an average penetration depth $PD_{avg}$ that is equal to $(PD_1+PD_2)/2$ and an average minimum penetration base dimension $MD_{avg}$ that is equal to $(MD_1+MD_2)/2$. The ratio of the average penetration depth to the average minimum penetration base dimension is sufficiently large so as to provide sufficient adhesion between light directing film 3020 and surface 3018. In some cases, the ratio (i.e. initially and after aging) of the average penetration depth to the average minimum penetration base dimension is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

Each unitary discrete structure 3030 includes a base 3031 that has a minimum base dimension 3032, where base 3031 is also the base of light directing portion 3070. For example, the base of unitary discrete structure 3030A has a minimum base dimension $BMD_1$ and the base of unitary discrete structure 3030B has a minimum base dimension $BMD_2$. The plurality of unitary discrete structures 3030 has an average minimum base dimension. For example, the unitary discrete structures 3030A and 3030B have an average minimum base dimension $BMD_{avg}$ that is equal to $(BMD_1+BMD_2)/2$. The average minimum penetration base dimension $MD_{avg}$ is sufficiently smaller than the average minimum base dimension $BMD_{avg}$ so that there is no, or very little loss, in the effective transmission of optical stack 3000. For example, in some cases, the average minimum penetration base dimension is less than about 20%, or about 15%, or about 10%, or about 9%, or about 8%, or about 7%, or about 6%, or about 5%, or about 4%, or about 3%, or about 2%, or about 1%, of the average minimum base dimension.

The optical stack 3000 includes a plurality of voids 3060 between optical adhesive layer 3025 and light directing film 3020. In some cases, the voids are discrete meaning that each void can be identified individually and as being separate from other voids. In some cases, a discrete void is bound on top by optical adhesive layer 3025, on bottom by light directing film 3020, on one side by the non-penetrating portion of a unitary discrete structure, and on the opposite side by the non-penetrating portion of a neighboring or adjacent unitary discrete structure. The voids are typically filled with air, thereby creating an air interface with the optically active structures (e.g. 3030).

The penetration of penetrating portions 3040 or unitary discrete structures 3030 into optical adhesive layer 3025 results in no, or very little, loss in the effective transmission of optical stack 3000. For example, in such cases, the initial average effective transmission of optical stack 3000 (i.e. without aging at conditions of elevated temperature and humidity) decreases by no more than 10%, or about 9%, or about 8%, or about 7%, or about 6%, or about 5%, or about 4%, or about 3%, or about 2%, or about 1%, as compared to an optical stack that has the same construction except that no unitary discrete structure penetrates into optical adhesive layer 3025.

Each unitary discrete structure 3030 includes a light directing portion 3070 that is designed primarily for directing light and a bonding portion 3080 that is designed primarily for bonding light directing film 3020 to surface 3018 or second substrate 3015. In some cases, at least portions of the bonding portion of each unitary discrete structure penetrates into optical adhesive layer 3025 and at least portions of the light directing portion of each unitary discrete structure does not penetrate into the optical adhesive layer. In some cases, such as when it is desirable to effectively direct light to enhance brightness, only at least portions of bonding portions 3080 penetrate into optical adhesive layer 3025 and no, or very little, portions of light directing portions 3070 penetrate into optical adhesive layer 3025.

Portions of each unitary discrete structure 3030 in the first plurality of unitary discrete structures penetrate into optical layer 3025. Portions of each unitary discrete structure 3030 in the first plurality of unitary discrete structures does not penetrate into optical layer 3025. Each unitary discrete structure (for example, unitary discrete structure 3030A) in the first plurality of unitary discrete structures defines a penetration depth (for example, $PD_1$) and a penetration base (for example, penetration base 3054) at an interface (for example, interface 3056) between the penetrating and non-penetrating portions of the unitary discrete structure. The penetration base has a minimum penetration base dimension (for example, $MD_1$). The first plurality of unitary discrete structures 3030 has an average penetration depth and an average minimum penetration base dimension. The ratio of the average penetration depth to the average minimum penetration base dimension is at least 1.5 and the peel strength between light directing film 3020 and optical layer 3025 is greater than about 50 grams/inch.

All the structures in the first plurality of unitary discrete structures are unitary. Furthermore, only a portion of each structure penetrates into optical layer 3025 resulting in an average penetration depth and an average minimum penetration base dimension. In addition, the ratio of the average penetration depth to the average minimum penetration base dimension is at least about 1.2, or at least about 1.4, or at least about 1.5, or at least about 1.6, or at least about 1.8, or at least about 2, or at least about 2.5, or at least about 3, or at least about 3.5, or at least about 4, or at least about 4.5, or at least about 5, or at least about 5.5, or at least about 6, or at least about 6.5, or at least about 7, or at least about 8, or at least about 9, or at least about 10, or at least about 15, or at least about 20.

In some cases, light directing film 3020 can include a second plurality of unitary discrete structures, where at least one unitary discrete structure in the second plurality of unitary discrete structures does not penetrate into optical layer 3025. For example, some unitary discrete structures in the second plurality of structures may be sufficiently shorter than structures 3030 so that they do not penetrate into optical layer 3025. For example, referring to FIG. 7, the first plurality of unitary discrete structures may include structures 3320 and the second plurality of unitary discrete structures may include structures 3330 that do not penetrate into an optical layer 3420 because they are shorter than structures 3320. In some case, light directing film 3020 can include a second plurality of structures that are composite and not unitary.

Figure 10:
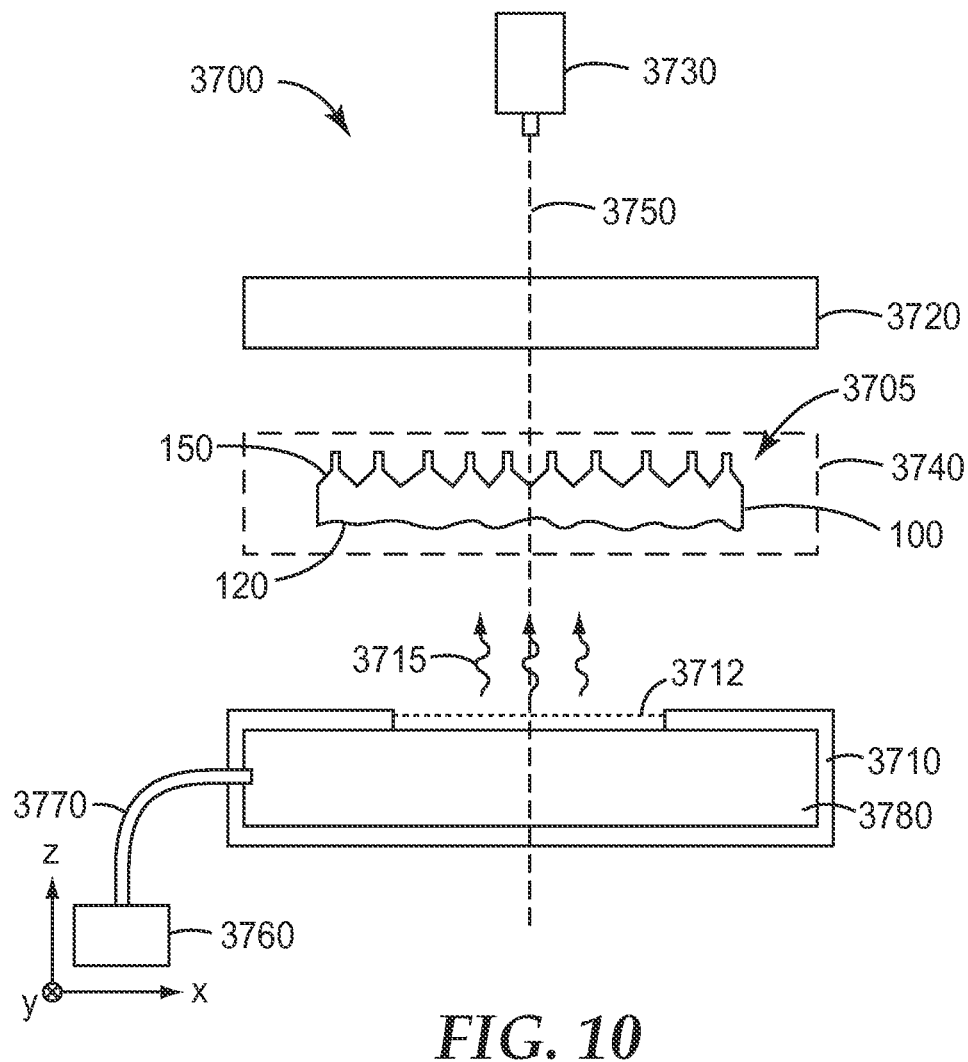
FIG. 10 is a schematic side-view of an optical system suitable for measuring optical gain.

Effective transmission (ET) can be measured using optical system 3700, a schematic side-view of which is shown in FIG. 10. Optical system 3700 is centered on an optical axis 3750 and includes a hollow lambertian light box 3710 that emits a lambertian light 3715 through an emitting or exit surface 3712, a linear light absorbing polarizer 3720 for polarizing light 3715, and a photodetector 3730. Light box 3710 is illuminated by a stabilized broadband light source 3760 that is connected to an interior 3780 of the light box via an optical fiber 3770. A test sample 3705, the ET of which is to be measured by the optical system, is placed at location 3740 between the light box and the absorbing linear polarizer.

Test sample 3705 can be any light directing film or optical stack disclosed herein. For example, test sample 3705 can be light directing film 100 having a plurality of linear unitary discrete structures 150 extending along the y-direction. The ET of light directing film 100 can be measured by placing the light redirecting film in location 3740 with unitary discrete structures 150 facing the photodetector and second major surface 120 facing the light box. Next, the spectrally weighted axial luminance $I_1$ (luminance along optical axis 3750) is measured through the linear absorbing polarizer by the photo detector. Next, light directing film 100 is removed and the spectrally weighted luminance $I_2$ is measured without the light directing film placed at location 3740. ET is the ratio $I_1/I_2$. ET0 is the effective transmission when linear unitary discrete structures 150 extend along a direction that is parallel to the polarizing axis of linear absorbing polarizer 3720, and ET90 is the effective transmission when linear unitary discrete structures 150 extend along a direction that is perpendicular to the polarizing axis of the linear absorbing polarizer. The average effective transmission (ETA) is the average of ET0 and ET90. In some embodiments, the average effective transmission (ETA) of an optical film intermediate or optical film stacks described herein is at least 1.2, 1.4, or 1.6. When the optical stack comprises a first and second optical film, each comprising optically active microstructures designed primarily to provide optical gain, the average effective transmission (ETA) of the optical film stack may be at least 2.10, or 2.15, or 2.20, or 2.25, or 2.35.

Notably, the adhesive composition is selected such that the penetration as well as the average effective transmission (i.e. gain) does not substantially change after aging. The aging conditions may vary. Unless specified otherwise, as used herein, "aging" refers to accelerated environmental aging that is conducted in a test chamber maintained at 65° C. and 95% relative humidity for a period of time of at least 200 hours and in some embodiments, at least 500 hours.

In favored embodiments, the average effective transmission (i.e. gain) exhibits a decrease in optical gain or no greater than 5% when the optical stack is conditioned at 65° C., 95% relative humidity for 200 hours. In some embodiments, the decrease is optical gain is no greater than 4%, 3.5%, 3%, 2.5%, 2%, or 1.5%.

The decrease in gain is related, at least in part, to the change in penetration (PD) with aging. It has been found that a decrease in optical gain of about 8% can result when the penetration changes by as little as 1.8 microns. For embodied microstructures described herein, such change can be a 62% increase in penetration. In some embodiments, there is no change is penetration with aging. In other embodiments, the change in penetration may be 5%, or 10%; yet no greater than 50%. In some embodiments, the change in penetration is no greater than 45%, 40%, 35%, 30%, or 25%.

A decrease in gain can also be caused by the adhesive deforming (e.g. creeping) with aging and thus covering a greater portion of the optically active portion.

The adhesive can be characterized as an optical adhesive, meaning it is optically transmissive, e.g., optically clear, in one or both of its uncured and cured state. Optical clarity allows the adhesive to be used in preparing optical elements. The adhesive can also maintain optical clarity, e.g., transmissivity, for a useful period of time under normal use conditions and as shown by accelerated aging tests.

Preferred uncured adhesives according to the invention can exhibit a luminous transmission of at least about 90%. Upon curing, optical clarity of the cured adhesive, as measured according to ASTM-D 1003-95, can be in the same ranges.

The adhesive in the absence of filler typically has a haze of less than about 2%, and an opacity of less than about 1%. However, filler can be added to increase the haze to at least 2%, or 5%, or 10%. The haze is generally less than 30% for most uses.

The various articles described herein (e.g. optical stacks and intermediate optical assembly thereof) comprise an adhesive layer comprising a cured adhesive composition. A cured adhesive layer comprising an interpenetration polymer network (IPN) has been found to be a favored composition to obtain the combination of properties described herein.

A favored adhesive composition comprises a polyacrylate and a polymerizable monomer wherein upon curing the adhesive forms an interpenetrating polymer network.

There are at least two types of interpenetrating polymer networks, those that do not react between components, and those that do react to form a chemical bond between different components (inter-reacted IPNs). Specifically, one form of IPN includes polyacrylate polymers and a polymerized monomer (e.g. epoxy or multi-(methacrylate)) that entangles the polymer chains into a network that is mechanically intertwined. The mechanical entanglement of the IPN adds strength and integrity to the adhesive and can prevent phase separation and loss of clarity. A second form of IPN according to the invention includes an inter-reacted interpenetrating polymer network, wherein the epoxy component is directly or indirectly chemically bonded to the polyacrylate component. Here, the polymerizable monomer contains reactive functional groups that can react directly or indirectly with the polyacrylate. As an example, an epoxy group is directly reactive with a hydroxy or acidic functionality of the polyacrylate component. Alternatively, the polyacrylate and epoxy components can be chemically bonded to an intermediate chemical component such as a di- or multi-functional polymer, crosslinker, macromer, or oligomer. The intermediate chemical component chemically connects the epoxy component to the polyacrylate, producing an IPN.

The polyacrylate, utilized as a component, is a polymeric component generally prepared by polymerizing (meth)acrylate monomers. Acrylate and methacrylate monomers are referred to collectively herein as "(meth)acrylate" monomers. Polymers prepared from one or more of such (meth)acrylate monomers, optionally with any one or more of a variety of other useful monomers, will be referred to collectively as "polyacrylates." The polymers can be homopolymers or copolymers, optionally in combination with other, non-(meth)acrylate, e.g., vinyl-unsaturated, monomers. Hence, the polyacrylate is polymerized prior to being combined with monomer having functional groups that copolymerize with the polyacrylate component.

Specific examples of polyacrylate polymers useful according to the invention include those prepared from free-radically polymerizable acrylate monomers or oligomers such as described in U.S. Pat. No. 5,252,694 at col. 5, lines 35-68. While the invention can be accomplished with any variety of different (meth)acrylate monomers and polyacrylates, in a favored embodiment, the polyacrylate to includes one or more reactive functional groups that can be reacted to connect the polyacrylate directly or indirectly to the epoxy component, i.e. for connecting the polyacrylate to the epoxy component to produce an interpenetrating polymer network. These reactive functional groups can be any known reactive groups, such as hydroxy (—OH) or acidic (e.g., carboxylic, —COOH) reactive groups. Such groups can be included in a polyacrylate, for example, by including an appropriate monomer in preparing the polyacrylate, such as an acrylic acid monomer. Alternatively, this inter-reaction between polyacrylate and epoxy can be achieved through the use of bi- or multi-functional monomers such as epoxy acrylates in conjunction with grafting groups that can react with the polyacrylate. Examples of useful monomers include specifically, but not exclusively, the following classes:

(i) acrylic acid esters of an alkyl alcohol (preferably a non-tertiary alcohol), the alcohol containing from 1 to 14 (preferably from 4 to 14) carbon atoms and include, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate;

(ii) methacrylic acid esters of an alkyl alcohol (preferably a non-tertiary alcohol), the alcohol containing from 1 to 14 (preferably from 4 to 14) carbon atoms and include, for example, methyl methacrylate, ethyl methacrylate, n-propyl methacrylate, n-butyl methacrylate, isobutyl methacrylate and t-butyl methacrylate;

(iii) (meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl(meth)acrylates;

The monomeric repeat units of the polyacrylate component are generally chosen such that the polyacrylate component is a pressure sensitive adhesive.

Pressure sensitive adhesive (PSA) compositions are well known to those of ordinary skill in the art to possess properties including (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power.

The PSA properties of the polyacrylate are typically provided by inclusion of sufficient monomeric repeat units comprising C4-C12 alkyl groups. Such alkyl groups are typically branched. In some embodiments, the polyacrylate comprises isooctyl repeat units. In other embodiments, the polyacrylate comprises butyl and/or hexyl repeat units. In yet other embodiments, the polyacrylate comprises a combination of C4-C12 alkyl groups, such as hexyl and butyl. The amount (percentage by weight) of the C4-C12 alkyl monomeric repeat units can vary depending on the chain length of the C4-C12 alkyl group(s) present in the polyacrylate. In the case of isooctyl the concentration is typically at least 50 to 60 wt-% of the polyacrylate. However, when the C4-C12 alkyl group has a chain length greater than octyl, the concentration may be lower. Further, when the C4-C12 alkyl group has a chain length greater less than octyl, the concentration may be higher. Hence, the concentration of C4-C12 alkyl repeat units may range from about 40 to about 70 wt-% of the polyacrylate.

With regard to the total adhesive composition or cured adhesive layer that further comprises a copolymerizable monomer, the concentration of C4-C12 alkyl repeat units, such as isooctyl, typically ranges from about 15 to 50 wt-%.

The polyacrylate also typically comprises repeat units derived from acrylic acid. The concentration of repeat units derived from acrylic acid typically range from 0 to 15 wt-%. In one embodiment, the oxirane moieties of the epoxy monomer copolymerize with the acrylic acid moieties of the polyacrylate forming an inter-reacted interpenetrating polymer network.

By inclusion of sufficient polyacrylate, the uncured adhesive is typically sufficiently pressure sensitive. This allows the uncured adhesive to conveniently and accurately be applied and positioned, e.g., between a substrate and a material to be bonded to the substrate. Subsequently, the curable adhesive can be cured to create a structural bond between materials.

The adhesive composition or cured adhesive layer typically comprises at least 35 or 40 wt-% of polyacrylate. Further, the concentration of polyacrylate is generally no greater than 70 wt-% or 75 wt-%.

The adhesive composition comprises at least one polymerizable monomer. In some embodiments, a single monomer is utilized. In other embodiments, a mixture of monomers is employed. The monomer or mixture of monomer is typically a liquid at ambient temperature (e.g. 25° C.); whereas the polyacrylate component is a solid at ambient temperature. The monomer(s) are chosen such that the polyacrylate dissolves in monomer. This one function of the polymerizable monomer is to serve as a reactive diluent for the polyacrylate. Without intending to be bound by theory, dilution of the polyacrylate prior to curing (temporary) decreases the modulus of the polyacrylate, which is amenable to the unitary structures partially penetrating the adhesive layer.

The concentration of polymerizable monomer in the uncured adhesive (or polymerized monomer of the cured adhesive) is typically at least 20 wt-% or 25 wt-%. Further, the concentration of polymerizable monomer is typically no greater than 60 wt-% or 65 wt-%.

The polymerizable monomer comprises functional groups (such as epoxy or (methacrylate groups). The molecular weight of the polymerizable monomer is typically less than 150 g/mole per functional group, and preferably less than 145 g/mole or 140 g/mole per functional group. In some embodiments, such a when the polymerizable monomer is a (meth)acrylate monomer, the molecular weight of the polymerizable monomer divided by the number of functional groups is at least 95 g/mole, or about 100 g/mole. In other embodiments, such a when the polymerizable monomer is an epoxy monomer, the molecular weight of the polymerizable monomer divided by the number of functional groups is at least 110 g/mole, 115 g/mole, or 120 g/mole. The molecular weight of the polymerizable monomer per functional group is typically at least 90 g/mole.

In some favored embodiments, the polymerizable monomer comprises functional groups that copolymerize with the polyacrylate component.

In some embodiments, the adhesive composition comprises a polyacrylate and an epoxy component. In this embodiment, the adhesive composition typically comprises a cationic initiator for curing the epoxy component.

Suitable epoxy materials for use according to the invention will also be recognized by those of skill in the chemical and adhesive and structural adhesive arts. Such epoxy materials include cationically-polymerizable monomers, a large variety of which are well known in the chemical and adhesive arts. General examples of useful epoxy component include epoxy monomers and macromers, as well as multifunctional epoxy crosslinkers. In some embodiments, the epoxy monomers or macromers are aliphatic and may include cyclic aliphatic groups. In other embodiments, the epoxy monomers or macromers comprise aromatic groups. Bisphenol F and especially bisphenol A epoxies are commercially available from several suppliers.

In one embodiment, the polymerizable monomer of the adhesive is a cycloaliphatic epoxy monomer, such as commercially available from Cytec Industries (Woodland Park N.J.) under the trade designation "Uvacure 1500".

In another embodiment, the polymerizable monomer of the adhesive is a glycol epoxy monomer, such as commercially available from Dow Chemical, under the trade designation, "D.E.R. 736".

In other embodiments, the adhesive composition comprises a polyacrylate (e.g. PSA polymer) and a multi-(meth) acrylate polymerizable monomer. In this embodiment, the adhesive composition typically comprises a free-radical initiator for curing multi-(meth)acrylate.

Multi-(meth)acrylates comprise at least two polymerizable (meth)acrylate groups including di-, tri-, etc., functional (meth)acrylate compounds. However, (meth)acrylate monomers having at least three (meth)acrylate group (commonly referred to as crosslinkers) are preferred to obtain the favored molecular weight of less than 150 g/mole per functional (e.g. (meth)acrylate) group, as previously described. Examples of preferred crosslinkers include trimethylolpropane triacrylate (TMPTA), pentaerythritol tri(meth)acrylate, pentaerythritol tetra(meth)acrylate, dipentaerythritol penta(meth)acrylate, dipentaerythritol hexa (meth)acrylate, trimethylolpropane ethoxylate tri(meth) acrylate, glyceryl tri(meth)acrylate, pentaerythritol propoxylate tri(meth)acrylate, and ditrimethylolpropane tetra(meth)acrylate. Any one or combination of crosslinking agents may be employed.

At least one initiator is included in the adhesive to cure the adhesive. Typical amounts of initiator (e.g. photoinitiator) can be in the range from about 0.1 to about 5 parts by weight, about 0.5 to about 3 parts by weight of the total adhesive composition being preferred.

Useful cationic photoinitiators include any of a variety of known useful materials for curing epoxies, including examples such as onium salts and certain organometallic complexes. The description of exemplary organometallic complexes as well as their use with a number of epoxies and acrylates, can be found, for example, in U.S. Pat. Nos. 5,252,694, 5,897,727, and 6,180,200, the entire disclosures of which are incorporated herein by reference.

Exemplary onium salts have been described as having the structure AX wherein: A can be an organic cation, e.g., selected from diazonium, iodonium, and sulfonium cations, preferably selected from diphenyliodonium, triphenylsulfonium and phenylthiophenyl diphenylsulfonium; and X is an anion, the counterion of the onium salts including those in which X is organic sulfonate, or halogenated metal or metalloid.

Particularly useful onium salts include, but are not limited to, aryl diazonium salts, diaryl iodonium salts, and triaryl sulfonium salts. Additional examples of the onium salts are described in U.S. Pat. No. 5,086,086, col. 4, lines 29-61, the entire disclosure of which is incorporated herein by reference.

Free-radical photoinitiators useful for polymerizing a polyacrylate in combination with grafting agents and/or epoxy-acrylates, or multifunctional acrylate crosslinkers include the benzoin ethers, such as benzoin methyl ether or benzoin isopropyl ether, substituted benzoin ethers, such as anisoin methyl ether, substituted acetophenones, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene-sulfonyl chloride, and photoactive oximes, such as 1-phenyl-1,2-propanedione-2(O-ethoxycarbonyl)-oxime. In some embodiments, the free radical photoinitiator is a phosphine oxides, such as 2,4,6-trimethylbenzoyldiphenylphosphine oxide and bis(2,4,6-trimethylbenzoyl)-phenylphosphine oxide.

Photosensitizers can be employed in the curable adhesive composition. Photosensitizers can be used to alter the wavelength sensitivity of a photoinitiator. Representative examples of photosensitizers include anthracene, benzophenone, perylene, phenothiazine, xanthone, thioxanthone, acetophenone, fluorenone, anthraquinone, 9-methylanthracene, 2-ethyl-9,10-dimethoxyanthracene, 9,10-diethoxy anthracene, camphorquinone, and 1,3-diphenylisobenzofuran.

Other materials that can be included in the curable adhesive include mono- and polyols, tackifiers, reinforcing agents, and other modifiers, some of which may copolymerize with the free-radically or cationically polymerizable monomers, oligomers, or polymers, or polymerize independently. When present such optical materials are typically utilized in no greater than 5 wt-% or 10 wt-%. In favored embodiments, the adhesive is free of tackifiers and plasticizers that are liquids at ambient temperature, since the inclusion of such can lower the elastic modulus and/or increase creep upon aging.

The cured adhesive composition can be characterized by use of dynamic mechanical analysis (as further described in the examples).

The elastic modulus (E') at 25° C. is surmised related, at least in part, to the retained brightness and/or penetration with aging. The elastic modulus is typically at least 100 MPa. In some embodiments, the elastic modulus, is at least 200 MPa, or 300 MPa, or 400 MPa, or 500 MPa. The elastic modulus is typically no greater than 2000 MPa.

The average toughness at 25° C. and a strain rate of 3%/min is typically at least 1 $MJ/m^3$. In some embodiments, the average toughness is at least 2, or 3, or 4, or 5 $MJ/m^3$. The average toughness is typically no greater than 15 $MJ/m^3$.

The elongation of the cured adhesive composition is surmised related, at least in part, to the peel strength. In some embodiments, the average elongation at break at 25° C. and a strain rate of 3%/min is at least 15% or 20% and in some embodiments, at least 25%, 50%, or at least about 100%. The average elongation at break is typically no greater than 300%.

In order to obtain a thin adhesive layer, adhesive coating composition typically comprises solvent (i.e. not a reactive diluent) in an amount ranging from 85% to 97%. Representative solvents preferably organic, include acetone, methyl-ethyl-ketone, ethyl acetate, heptane, toluene, cyclopentanone, methyl cellosolve acetate, methylene chloride, nitromethane, methyl formate, gamma-butyrolactone, propylene carbonate, and 1,2-dimethoxyethane (glyme). In a typical process, solvent is removed via drying to yield a thin adhesive.

The curable adhesive compositions can be prepared by conventional methods of combining and optionally reacting (meth)acrylate materials, polyacrylate materials, epoxies, photoinitiators, and any adjuvants. See, for example, U.S. Pat. Nos. 5,252,694, 5,897,727, and 6,180,200. Generally, polyacrylate materials such as those described above can be directly combined with the described epoxy materials and other components of a curable adhesive composition, including crosslinkers, initiators, etc., in amounts as useful and as described herein.

In one method of making an optical construction, the method comprises applying a layer of an adhesive composition to a substrate; contacting the protruding structure with the substrate such that the structure partially penetrates the adhesive layer forming a separation between the adhesive layer and the first surface; and curing the adhesive.

In some embodiments, the adhesive is applied to the (e.g. unstructured) surface of the second optical film. Alternatively, the adhesive can be first applied to a release liner, which in then contacted with the protruding structure such that the structure partially penetrates the adhesive layer providing an (intermediate) optical assembly The release liner may thereafter be stripped away to expose a major surface (e.g. 2061 of FIG. 5) of optical adhesive layer 2060 that can, for example, be bonded to another (e.g. optical film) substrate or surface. The release force for releasing the optical adhesive layer from a release liner is generally less than about t 50 g-force/inch.

Once the optical stack has been assembled, the adhesive is cured, typically by photocuring. Irradiation sources that provide light in the region from 200 to 800 nm are effective for curing the adhesive according to the invention. A preferred region is between 250 to 700 nm. Suitable sources of radiation include mercury vapor discharge lamps, carbon arcs, quartz halogen lamps, tungsten lamps, xenon lamps, fluorescent lamps, lasers, sunlight, etc. The required amount of exposure to effect polymerization can depend on factors such as the identity and concentrations of particular free radically and cationically polymerizable monomers, the thickness of the exposed material, type of substrate, intensity of the radiation source and amount of heat associated with the radiation.

The curable adhesive compositions may be applied by any conventional application method, including but not limited to gravure coating, curtain coating, slot coating, spin coating, screen coating, transfer coating, brush or roller coating, and the like. The thickness of a coated adhesive layer, typically in the form of a liquid, prior to curing, is in part dependent on the nature of the materials used and the specific properties desired, but those properties and the relationship of thickness to the properties is well understood in the art. Exemplary thicknesses of an uncured, curable adhesive layer may be in the range from about 0.05 to about 20 micrometers.

The light directing films and optical stacks disclosed herein can be employed in any application that may be desirable to increase brightness, reduce the number of separate components or layers, and reduce the overall thickness. Exemplary applications include televisions, computer monitors, projectors, potable displays such as portable video players, and hand-held devices such as cell-phones. Other exemplary application include large displays, such as large area televisions, and small displays, such as cell-phone displays. Other exemplary applications include displays for displaying an image or information or general lighting optical systems.

Some of the advantages of the disclosed light directing films, optical stacks, and optical systems are further illustrated by the following examples. The particular materials, amounts and dimensions recited in this example, as well as other conditions and details, should not be construed to unduly limit the present invention.

EXAMPLES

These examples are merely for illustrative purposes only and not meant to be limiting on the scope of the appended claims. All parts, percentages, ratios, etc. in the examples and the rest of the specification are by weight unless otherwise indicated.

The following list of materials is referred to throughout the examples.

| Component | Supplier | Description | % Solids |
|---|---|---|---|
| Polyacrylate PSA A | 3M Company (St. Paul MN) | Terpolymer of isooctyl acrylate (57.5%), methyl acrylate (35%), and acrylic acid (7.5%) having an intrinsic viscosity of 1.6. | 26.1 |
| Polyacrylate PSA B | 3M Company (St. Paul MN) | Terpolymer of isooctyl acrylate (50%), ethyl acrylate (40%), and acrylic acid (10%) having an intrinsic viscosity of 1.9. | 21.2 |
| Uvacure 1500 | Cytec Industries (Woodland Park NJ) | Cycloaliphatic Diepoxide | 100 |
| D.E.R. 736 | Dow Chemical (Midland MI) | Polyethylene Glycol Diepoxide | 100 |
| SR306 | Sartomer (Exton PA) | Tripropylene Glycol Diacrylate | 100 |
| CN964 | Sartomer (Exton PA) | Aliphatic Urethane Diacrylate | 100 |
| SR351 | Sartomer (Exton PA) | Trimethylolpropane Triacrylate | 100 |
| Toluene | Aldrich Chemical (Milwaukee WI) | Solvent | 0 |
| Methanol | Aldrich Chemical (Milwaukee WI) | Solvent | 0 |
| Ethyl Acetate | Aldrich Chemical (Milwaukee WI) | Solvent | 0 |
| Uvacure 1600 | Cytec Industries (Woodland Park NJ) | Diaryl Iodonium Hexafluoroantimonate Salt, Cationic Photoinitiator | 100 |
| Additol ITX | Cytec Industries (Woodland Park NJ) | Isopropylthioxanthone | 100 |
| Lucirin TPO | BASF (Charlotte NC) | Photoinitiator | 100 |
| Luviskol Plus | BASF (Charlotte NC) | Poly(vinyl caprolactam) | 40 |
| MX300 | Soken Chemical (Japan) | Crosslinked poly(methyl methacrylate) spherical beads. The beads have a nominal diameter of 3 microns. | 100 |

Optical Films Utilized in the Examples:

Film A is a prism film made according to the process described in U.S. Pat. No. 5,175,030 and U.S. Pat. No. 5,183,597 using a master tool produced according to the process described in US2009/0041553. The prisms for this film run cross-web. The plano side of the polyester substrate is primed to promote adhesion.

Film B is a prism film made according to the process described in U.S. Pat. No. 5,175,030 and U.S. Pat. No. 5,183,597. Specifically Film B is an example of the class of prism films described in WO2011/130155. A representative schematic side-view of Film B is illustrated in FIG. 1. Unitary discrete structures 150 extended along the y-direction and were disposed on a substrate 130. Substrate 130 was made of PET, had a thickness of about 29 microns and an index of refraction of about 1.65. The cured index of refraction of structures 110 was about 1.56. Each unitary discrete structure included a bonding portion 170 designed primarily for bonding the light directing film to a surface and disposed on a light directing portion 160 designed primarily for directing and recycling light.

Each bonding portion 170 included two opposing side facets 172 that made angles with the xy-plane (the plane of the light directing film) that were about 80-85 degrees. Each bonding portion had a base 174, a minimum base dimension $d_2$ that was about 1.5 (±0.5) microns, and a maximum height $h_2$ that was about 4 (±0.5) microns. Each light directing portion 160 included two opposing side facets 162 that made angles α with the xy-plane (the plane of the light directing film) that was about 45 degrees. Each light directing portion had a minimum base dimension $d_1$ of about 24 microns, and a maximum height $h_1$ that was about 12 microns. Light directing film 100 had an average effective transmission ETA of about 1.56.

Figure 11:
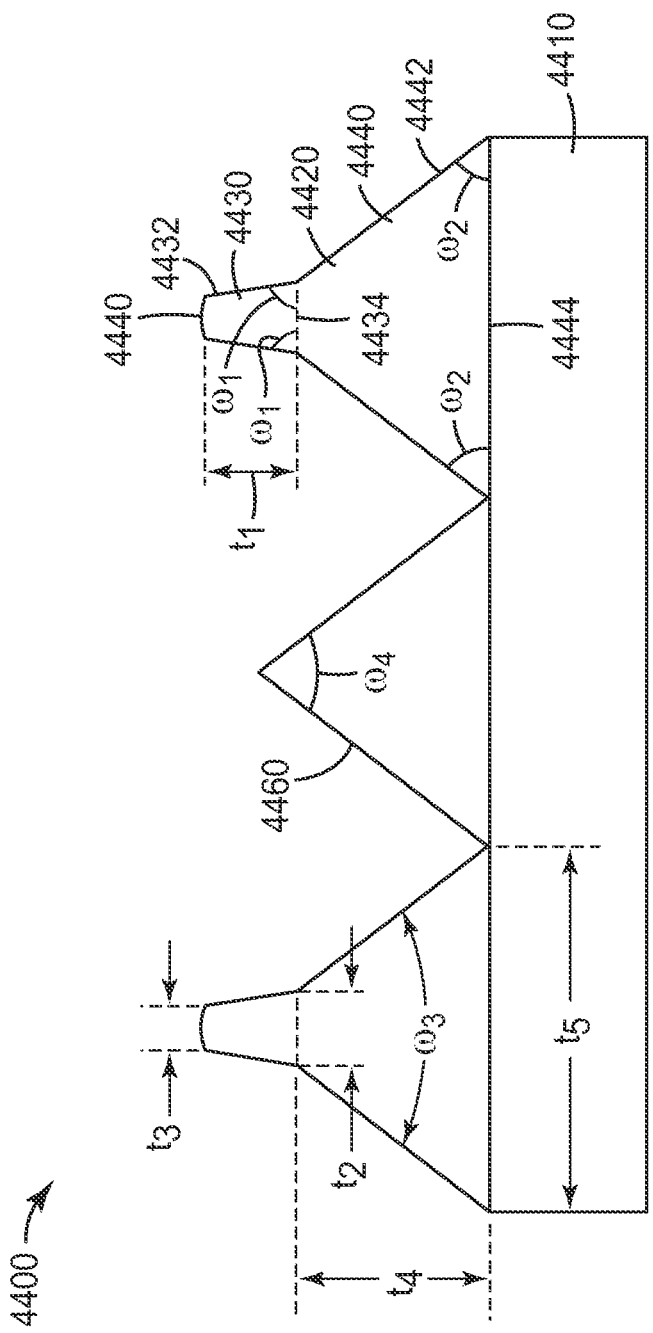
FIG. 11 is a schematic side-view of another optical stack.

Film C is a prism film made according to the process described in U.S. Pat. No. 5,175,030 and U.S. Pat. No. 5,183,597. Specifically, Film C is an example of the class of prism films described in WO2011/130155. A representative schematic side-view of Film C is illustrated in FIG. 11. Light directing film 4400 was similar to light directing film 3300 and included a first plurality of linear symmetric unitary discrete structures 4420 and a second plurality of linear symmetric discrete structures 4460. Structures 4420 and 4460 extended along the y-direction and were disposed on a substrate 4410. Substrate 4410 was made of PET, had a thickness of about 29 microns and an index of refraction of about 1.65. The cured index of refraction of structures 4420 and 4460 was about 1.56. Each unitary discrete structure included a bonding portion 4430 designed primarily for bonding the light directing film to a surface and disposed on a light directing portion 4440 designed primarily for directing and recycling light. Discrete structures 4460 did not include any bonding portions and were primarily designed to direct and recycle light. Unitary discrete structures 4420 alternated with discrete structures 4460.

Each bonding portion 4430 included two opposing side facets 4432 that made angles $\omega_1$ with the xy-plane (the plane of the light directing film) that were about 80-85 degrees. Each bonding portion had a base 4434, a minimum base dimension t2 that was about 1.5 (±0.5) microns, and a maximum height t1 that was about 4 (±0.5) microns. Each bonding portion also included a curved or rounded top surface that had a minimum top surface dimension t3 of about 0.2 (±0.2) microns. Each light directing portion 4420 included two opposing side facets 4442 that made angles $\omega_2$ with the xy-plane (the plane of the light directing film) that was about 45 degrees. Each light directing portion had a base 4444, a minimum base dimension t5 of about 24 microns, and a maximum height t4 that was about 12 microns. The z-axis offset height difference between the apex of the bonding portion 4430 of unitary discrete structure 4420 and the apex of the apex of discrete structure 4460 was 2.6 microns. Light directing film 4400 had an average effective transmission ETA of about 1.63.

Film D is a prism film made according to the process described in U.S. Pat. No. 5,175,030 and U.S. Pat. No. 5,183,597. Specifically, Film E is an example of the class of prism films described in WO2011/130144. A representative schematic side-view of Film D is illustrated in FIG. 11. Light directing film 4400 was similar to light directing film 3300 and included a first plurality of linear symmetric unitary discrete structures 4420 and a second plurality of linear symmetric discrete structures 4460. Structures 4420 and 4460 extended along the y-direction and were disposed on a substrate 4410. Substrate 4410 was made of PET, had a thickness of about 29 microns and an index of refraction of about 1.65. The cured index of refraction of structures 4420 and 4460 was about 1.56. Each unitary discrete structure included a bonding portion 4430 designed primarily for bonding the light directing film to a surface and disposed on a light directing portion 4440 designed primarily for directing and recycling light. Discrete structures 4460 did not include any bonding portions and were primarily designed to direct and recycle light. Unitary discrete structures 4420 alternated with discrete structures 4460.

Each bonding portion 4430 included two opposing side facets 4432 that made angles $\omega_1$ with the xy-plane (the plane of the light directing film) that was about 80-85 degrees. Each bonding portion had a base 4434, a minimum base dimension t2 that was about 1.5 (±0.5) microns, and a maximum height t1 that was about 4 (±0.5) microns. Each bonding portion also included a curved or rounded top surface that had a minimum top surface dimension t3 of about 0.2 (±0.2) microns. Each light directing portion 4420 included two opposing side facets 4422 that made angles $\omega_2$ with the xy-plane (the plane of the light directing film) that was about 45 degrees. Each light directing portion had a base 4444, a minimum base dimension t5 of about 24 microns, and a maximum height t4 that was about 12 microns. The z-axis offset height difference between the apex of the bonding portion 4430 of unitary discrete structure 4420 and the apex of the apex of discrete structure 4460 was 7 microns. Light directing film 4400 had an average effective transmission ETA of about 1.66.

Method of Making Optical Stack:
Coating and Lamination Process for Making Optical Stack:

The solution was coated on the plano side of Film A using a slot-type die at a width of 8 in (20.32 cm) and a web speed of 25 ft/min (7.62 m/min). Solution was delivered using a gear driven pump at a specified flow rate. The coated film was dried in a convection oven maintained at a temperature of 150° F. (65.6° C.) and a dew point of 25° F.; the oven length was 30 ft (9.14 m).

Adhesive coated Film A was conveyed to a lamination station and laminated to the structured side of Film B. The laminator was configured with a rubber roll (Shore A Durometer of 68) nipped against a steel roll; the nip pressure was maintained at approximately 1.3 lbf/in (2.3 N/cm).

The laminate was conveyed to a UV curing station. The laminated stack was exposed to actinic radiation; the radiation source was positioned such that the adhesive was cured through Film B. The curing station was comprised of a Fusion F600 (Fusion UV Systems, Gaithersburg Md.) and a temperature controlled steel backup roll. The Fusion UV source was configured with a D Bulb and an aluminum reflector. The UV output was characterized using a UV PowerPuck (EIT Inc., Sterling N.Y.). The measured UV dosages were 1.749 J/cm$^2$ (UV-A), 0.497 J/cm$^2$ (UV-B), 0.066 J/cm$^2$ (UV-C) and 0.925 J/cm$^2$ (UV-V). The UV backup roll was maintained at a temperature of 70° F. (21.1° C.).

Making of Haze/Clarity Optical Controls:
Coating Process for Making Haze/Clarity Optical Controls:

The solution was coated on the primed side 2 mil PET film using a slot-type die at a width of 8 in (20.32 cm) and a web speed of 25 ft/min (7.62 m/min). Solution was delivered using a gear driven pump at a specified flow rate. The coated film was dried in a convection oven maintained at a temperature of 150° F. (65.6° C.) and a dewpoint of 25° F.; the oven length was 30 ft (9.14 m).

The dried adhesive coating was conveyed to a UV curing station. The adhesive coating was exposed to actinic radiation, and the UV curing station was purged with nitrogen to maintain an oxygen level of less than 200 ppm. The curing station was comprised of a Fusion F600 (Fusion UV Systems, Gaithersburg Md.) and a cooling plate. The Fusion UV source was configured with an H Bulb and an aluminum reflector. The UV output was characterized using a UV PowerPuck (EIT Inc., Sterling N.Y.). The measured UV dosages at 25 fpm were 0.45 J/cm$^2$ (UV-A), 0.4 J/cm$^2$ (UV-B), 0.05 J/cm$^2$ (UV-C) and 0.3 J/cm$^2$ (UV-V).

Testing and Aging of Optical Stack:
Measurement of Optical Gain:

Each film or film laminate was placed on top of a diffusively transmissive hollow light box. The diffuse transmission and reflection of the light box were approximately Lambertian. The light box was a six-sided hollow rectangular solid of dimensions 12.5 cm by 12.5 cm by 11.5 cm made from diffuse PTFE plates about 0.6 mm thick. One face of the box was designated as the sample surface. The hollow light box had a diffuse reflectance of about 0.83% measured at the sample surface averaged over the 400-700 nm wavelength range. During the gain test the box was illuminated from within through a circular hole about 1 cm in diameter in the surface of the box opposite the sample surface, with the light directed toward the sample surface. The illumination was provided by a stabilized broadband incandescent light source attached to a fiber optic bundle used to direct the light (available as Fostec DCR-III with a one cm diameter fiber bundle extension from Schott North America, Southbridge Mass.). A linear absorbing polarizer (available as Melles Griot 03 FPG 007 from CVI Melles Griot, Albuquerque N. Mex.) was mounted on a rotary stage (available as ART310-UA-G54-BMS-9DU-HC from Aerotech, Pittsburgh, Pa.) and placed between the sample and the camera. The camera was focused on the sample surface of the light box at a distance of 0.28 m and the absorbing polarizer was placed about 1.3 cm from the camera lens. The luminance of the illuminated light box, measured with the polarizer in place and no sample films in place was greater than 150 cd/m². The sample luminance was measured with EPP2000 spectrometer (available from StellarNet Inc, Tampa, Fla.) connected to a collimating lens via a Vis-NIR fiber optic cable (available as F1000-Vis-NIR from Stellar-Net Inc, Tampa, Fla.); the spectrometer was oriented at normal incidence to the plane of the box sample surface when the sample films were placed on the sample surface. The collimating lens is composed of a lens tube (available as SM1L30 from Thorlabs, Newton, N.J.) and a plano-convex lens (available as LA1131 from Thorlabs, Newton, N.J.); the setup was assembled to achieve a focused spot size of 5 mm at the detector. Optical gain was determined as the ratio of the luminance with the sample film in place to the luminance from the light box with no sample present. For all films, optical gain was determined at polarizer angles of 0, 45 and 90 degrees relative the sample orientation. The average optical gain of the values measured at 0 and 90 degrees is reported.

Measurement of Peel Strength of Optical Stack:

Peel force was measured using an IMASS SP-2000 tester (available from IMASS Inc., Accord Mass.). Test strips 1 inch (2.54 cm) wide and approximately 10 in (25.4 cm) long were cut parallel to the prism orientation of the bottom prism film. Laminate strips were adhered to the tester platform using 1 inch (2.54 cm) wide Scotch double-coated tape (available as Scotch 665 from 3M Company, St. Paul Minn.). The tester was configured to measure the 180 degree peel force. Samples were oriented so that the plano side of the bottom prism film was adhered to the tester platform and the top film was attached to the force balance. The load cell capacity was 10 lbf (44.5 N). Peel force was measured at a rate of 12 in/min (30.5 cm/min). Data were collected after an initial delay of 2 seconds. Measurements were then averaged over a test period of 20 seconds. For each strip sample, a minimum of two sequential 20 second measurements were collected. Data were averaged for 3 strips measured twice each for a total 6 measurements.

Measurement of Haze and Clarity:

Haze and clarity values disclosed herein were measured using a Haze-Gard Plus haze meter (BYK-Gardiner, Silver Springs, Md.) according to the procedure described in ASTM D1003. Optical haze, as used herein, is defined as the ratio of the transmitted light that deviates from the normal direction by more than 4 degrees to the total transmitted light. Optical clarity is defined as $(T_1-T_2)/(T_1+T_2)$, where $T_1$ is the transmitted light that deviates from the normal direction between zero and 0.7 degrees, and $T_2$ is the transmitted light that lies between 1.6 and 2 degrees from the normal direction. In all cases, the optical films were measured with the coating facing toward the light source.

Environmental Aging of Optical Stack:

In typical display applications, optical films must be capable of maintaining performance regardless of environmental conditions and thermal history. Consequently laminated optical stacks must meet or exceed performance defined by the loose, unlaminated stack of optical films. To test the environmental performance of the optical stacks, 8.5 in by 9 in samples (21.6 cm×22.9 cm) were cut and placed in an environmental chamber (Envirotronics, Grand Rapids Mich.). The chamber was maintained at 65° C. and 95% RH; the chamber is routinely calibrated and certified according to ISO A2LA. Sample sheets were hung in the chamber such that the prism direction of the bottom prism film was oriented vertically. Samples were typically aged for a period of 200 h and 500 h. Unaged and aged optical stacks were characterized according to the testing procedures previously defined.

Making and Testing of Cured Adhesive Films:

Preparation of Bulk Adhesive Samples:

Adhesive formulations at 30% solids in ethyl acetate were coated on the treated side of a silicone release liner Flexvue T50 (Solutia, St. Louis Miss.) using a knotched bar coater. The knotched bar to film gap was set at 6 mils. Coated adhesive films were dried at 150° F. (65.6° C.) for 5 min in a forced convection oven. Dried adhesive films were taped to a thin steel plate at ambient temperature, then cured at 25 fpm using a Fusion UV Belt processor. The belt processor was equipped with an F600 configured with a D bulb and dichroic reflectors. The UV output was characterized using a UV PowerPuck (EIT Inc., Sterling N.Y.). The measured UV dosages were 1.287 J/cm² (UV-A), 0.348 J/cm² (UV-B), 0.041 J/cm² (UV-C) and 0.625 J/cm² (UV-V). The curing unit of the belt processor was purged with nitrogen to maintain an oxygen concentration below 200 ppm. The cured films were nominally 30 microns thick. After irradiation, samples were stored at ambient temperature for at least 24 h prior to any bulk characterization.

Characterization of Bulk Adhesive Samples:

Cured adhesive film samples were removed from the silicone release liner and characterized using a Q800 DMA (TA Instruments, New Castle Del.). Typical sample dimensions were 5.9 mm wide by 30 microns thick. The DMA was configured with the film/fiber characterization clamps.

The bulk elastic modulus and $T_g$ of the adhesive samples were characterized by performing a temperature scan (−20° C. to 85° C.) at a rate of 2° C./min. Samples were oscillated at a frequency of 1 Hz and a strain amplitude of 0.1%. The reported data represents an average of the properties for 3 samples prepared as described above. The following properties are reported: bulk storage modulus (E') measured at 25° C. and the glass transition temperature ($T_g$) as defined by the peak in the loss modulus (E").

Tensile toughness of the bulk samples was also characterized. Stress versus strain curves were generated for each adhesive formulation using a Q800 DMA. Samples were tested at a strain rate of 3%/min and at a temperature of 25° C. Data were averaged for a minimum of five test samples. The elongation at break ($\epsilon_f$) is reported along with the material toughness. The material toughness was determined by integrating the stress-strain curve from 0 to the strain at break ($\epsilon_f$).

Comparative:

Preparation of Coating Solution:

A coating solution was prepared by mixing 320.2 g of Polyacrylate PSA A, 39.0 g of SR306, 19.3 g of CN964, 653.2 g of ethyl acetate, 189.3 g of methanol, 264.6 g of toluene, 6.0 g of Lucirin TPO, and 5.2 g of Luviskol Plus. This coating solution represents a solvent based adhesive that upon drying may be cured by exposure to actinic radiation to form an interpenetrating network (IPN). The composition of the dried adhesive is summarized as follows.

Comparative Adhesive Composition

| Component | Wt-% |
| --- | --- |
| Polyacrylate PSA A | 55.6 |
| Monomer (SR306) | 26.1 |
| Monomer (CN964) | 12.9 |

| Component | Wt-% |
|---|---|
| Photoinitiator (Lucirin TPO) | 4.0 |
| Crosslinker (Luviskol Plus) | 1.4 |

Making of Optical Stack with Comparative Adhesive Composition:

Coating solution was delivered as described previously at a flow rate of 80 g/min. The nominal thickness of the dried adhesive coating was 4.5 microns.

Adhesive coated Film A was laminated to the structured side of Film B as described above with no modifications.

The initial and aged optical and mechanical properties of the Comparative Optical Stack are summarized in Table 1.
Control:
Preparation of Coating Solution:

A coating solution was prepared by mixing 375.5 g of Polyacrylate PSA A, 46.5 g of SR306, 632.1 g of ethyl acetate, 183.71 g of methanol, 257.22 g of toluene, 6.02 g of Lucirin TPO. This coating solution represents a solvent based adhesive that upon drying may be cured by exposure to actinic radiation to form an interpenetrating network (IPN). The reactive diluent, SR306, has two unsaturated acrylate moieties per molecule. This corresponds to a nominal molecular weight per unit functionality of 150. The composition of the dried adhesive is summarized as follows.

Control Adhesive Composition

| Component | Wt-% |
|---|---|
| Polyacrylate PSA A | 65.1 |
| Monomer (SR306) | 30.9 |
| Photoinitiator (Lucirin TPO) | 4.0 |

Making of Optical Stack with Control Adhesive Composition:

Coating solution was delivered as described previously at a flow rate of 75 g/min. The nominal thickness of the dried adhesive coating was 4.5 microns.

Adhesive coated Film A was laminated to the structured side of Film B as described previously with the following modifications. The laminator was enclosed and purged with nitrogen to inert the atmosphere entrapped between the structured side of Film B and the adhesive coated plano side of Film A. The oxygen concentration at the nip was monitored using a Series 3000 Trace Oxygen Analyzer (Alpha Omega Instruments, Cumberland R.I.). Nitrogen was supplied to maintain the residual oxygen concentration less than 250 ppm. Oxygen is a known inhibitor of free radical reactions and reduced levels are preferred to achieve uniform cure throughout the thickness of the adhesive.

The initial and aged optical and mechanical properties of the control are summarized in Table 1.
Free Radical Cured Adhesive Exhibiting Low Creep
Preparation of Coating Solution:

A coating solution was prepared by mixing 376.4 g of Polyacrylate PSA A, 47.46 g of SR351, 632.4 g of ethyl acetate, 184.64 g of methanol, 256.26 g of toluene, 6.02 g of Lucirin TPO. This coating solution represents a solvent based adhesive that upon drying may be cured by exposure to actinic radiation to form an interpenetrating network (IPN). The reactive diluent, SR351, has 3 unsaturated acrylate moieties per molecule. This corresponds to a nominal molecular weight per unit functionality of 99. The composition of the dried adhesive is summarized as follows.

Adhesive Composition 1

| Component | Wt-% |
|---|---|
| Polyacrylate PSA A | 65.3 |
| Monomer (SR351) | 31.5 |
| Photoinitiator (Lucirin TPO) | 4.0 |

Making of Optical Stack with Adhesive Composition 1:

Coating solution was delivered as described previously at a flow rate of 84 g/min. The nominal thickness of the dried adhesive coating was 5 microns.

Adhesive coated Film A was laminated to the structured side of Film B as described previously with the following modifications. The laminator was enclosed and purged with nitrogen to inert the atmosphere entrapped between the structured side of Film B and the adhesive coated plano side of Film A. The oxygen concentration at the nip was monitored using a Series 3000 Trace Oxygen Analyzer (Alpha Omega Instruments, Cumberland R.I.). Nitrogen was supplied to maintain the residual oxygen concentration less than 250 ppm. Oxygen is a known inhibitor of free radical reactions and reduced levels are preferred to achieve uniform cure throughout the thickness of the adhesive.

The initial and aged optical and mechanical properties of are summarized in Table 1.
Cationically Cured Adhesive Exhibiting Low Creep
Preparation of Coating Solution:

A coating solution was prepared by mixing 375.6 g of Polyacrylate PSA A, 50.07 g of Uvacure 1500, 633.0 g of ethyl acetate, 184.05 g of methanol, 256.3 g of toluene, 2.248 g of Uvacure 1600, and 0.190 g of Additol ITX. This coating solution represents a solvent based adhesive that upon drying may be cured by exposure to actinic radiation to form an interpenetrating network (IPN). The reactive diluent, Uvacure 1500, has 2 oxirane moieties per molecule. This corresponds to a nominal molecular weight per unit functionality of 125. The composition of the dried adhesive is summarized as follows.

Adhesive Composition 2

| Component | Wt-% |
|---|---|
| Polyacrylate PSA A | 65.1 |
| Monomer (Uvacure 1500) | 33.3 |
| Photoinitiator (Uvacure 1600) | 1.5 |
| Photosensitizer (Additol ITX) | 0.13 |

Making of Optical Stack with Adhesive Composition 2:

Coating solution was delivered as previously described at a flow rate of 84 g/min. The nominal thickness of the dried adhesive coating was 5 microns.

Adhesive coated Film A was laminated to the structured side of Film B as described previously with no modifications.

The initial and aged optical and mechanical properties are summarized in Table 1.

The initial optical gain and peel force for the laminated optical stacks were measured according to the test methods detailed above. The optical stacks were aged at 65° C. and 95% RH for 500 h according to the protocol described above. The optical gain and peel force for the aged optical stacks were measured.

Table 1 summarizes the initial and aged performance for optical stacks prepared with the Comparative Adhesive, Control Adhesive and Adhesive Compositions 1-2.

TABLE 1

| Adhesive Composition | Initial Optical Gain | Aged Optical Gain | % Decrease in Optical Gain | Initial Peel (gr-f/in) | Aged Peel (gr-f/in) |
|---|---|---|---|---|---|
| Comparative | 2.43 | 2.24 | 7.8 | 567 | 300 |
| Control | 2.33 | 2.14 | 8.1 | 253 | 226 |
| 1 | 2.36 | 2.30 | 2.5 | 69 | 118 |
| 2 | 2.38 | 2.34 | 1.8 | 349 | 239 |

Some additional adhesive formulations were prepared and characterized; these formulations are summarized as follows.

Adhesive Compositions 3-6

| Adhesive Composition | Polyacrylate PSA A (Wt-%) | Uvacure 1500 (Wt-%) | Uvacure 1600 (Wt-%) | Additol ITX (Wt-%) |
|---|---|---|---|---|
| 3 | 45 | 53.4 | 1.5 | 0.13 |
| 4 | 55 | 43.4 | 1.5 | 0.13 |
| 5 | 70 | 28.4 | 1.5 | 0.13 |
| 6 | 75 | 23.4 | 1.5 | 0.13 |

The bulk properties for the cured Control adhesive and Adhesive Compositions 1-4 were characterized using dynamic mechanical spectroscopy. Samples were prepared and tested as described above. The measured adhesive properties are as follows.

Bulk Adhesive Material Properties

| Adhesive Composition | E' at 25° C. (MPa) | $T_g$ (° C.) Peak in E" | Average Elongation at Break (%) | Average Toughness (MJ/m$^3$) |
|---|---|---|---|---|
| Control 1 | 44 | −4.4 | 18 | 1.1 |
| 1 | 485 | −1.8 | 18 | 1.1 |
| 2 | 587 | −0.9 | 101 | 9.0 |
| 3 | 1542 | 6.1 | 32 | 6.9 |
| 4 | 1073 | 3.8 | 64 | 9.5 |

Additional optical stacks were made and tested according to the protocol described in the Cationically Cured Adhesive Exhibiting Low Creep example. These additional optical stacks were made using Adhesive Compositions 5 and 6. The nominal dried adhesive thickness for these examples was 4.5 microns. Initial optical gain and peel force for the laminated optical stacks were measured and are summarized in the following table. The laminated optical stacks were aged at 65° C. and 95% RH for 500 h. Optical gain for the aged laminated optical stacks were measured and are also summarized.

Optical Stack Testing

| Adhesive Composition | Initial Optical Gain | Aged Optical Gain | % Decrease in Optical Gain | Initial Peel (gr-f/in) |
|---|---|---|---|---|
| 5 | 2.39 | 2.33 | 2.84 | 247 |
| 6 | 2.38 | 2.29 | 3.83 | 235 |

The penetration distance PD of the bonding portions of the optical stacks prepared with Adhesive Composition 5 and the Comparative Adhesive Composition were measured initially and after aging at 65° C. and 95% RH for 200 h. Samples were prepared by cross sectioning the laminated optical stacks using a razor blade, a fixture for holding the razor blades, and a small arbor press. Cross sections were sputter coated with a thin layer of conductive material and imaged using a scanning electron microscope at a magnification of 8,000×. The measured change in PD is summarized as follows.

Penetration of Bonding Portions of Optical Stack

| Adhesive Composition | Initial PD (microns) | Aged PD (microns) | % Increase in PD |
|---|---|---|---|
| Comparative | 2.9 | 4.7 | 62 |
| 5 | 3.1 | 3.1 | 0 |

Additional optical stacks were made and tested according to the protocol described in the Cationically Cured Adhesive Exhibiting Low Creep example. Polymeric, spherical beads were added to the adhesive formulation to generate haze and reduce clarity. These diffuse optical adhesives are known to mitigate optical artifacts such as reflective moiré and hide cosmetic defects. The following table summarizes the dried adhesive composition and nominal adhesive thickness used to make the diffuse laminated optical stacks.

Adhesive Compositions 7-11

| Adhesive Composition | Polyacrylate PSA A (Wt-%) | Uvacure 1500 (Wt-%) | Uvacure 1600 (Wt-%) | Additol ITX (Wt-%) | MX300 (Wt-%) | Adhesive Thickness (microns) |
|---|---|---|---|---|---|---|
| 7 | 60.1 | 30.8 | 1.4 | 0.12 | 7.5 | 5.0 |
| 8 | 55.6 | 35.4 | 1.4 | 0.12 | 7.5 | 5.0 |
| 9 | 50.8 | 40.1 | 1.4 | 0.12 | 7.5 | 4.5 |
| 10 | 46.4 | 44.6 | 1.4 | 0.11 | 7.5 | 4.0 |
| 11 | 41.4 | 49.6 | 1.4 | 0.12 | 7.5 | 3.5 |

Initial optical gain and peel force for the diffuse laminated optical stacks prepared with Adhesive Compositions 7-11 were measured and are summarized as follows. The laminated optical stacks were aged at 65° C. and 95% RH for 500 h. Optical gain for the aged laminated optical stacks were measured and are also summarized as follows:

Optical Stack Testing

| Adhesive Composition | Initial Optical Gain | Aged Optical Gain | % Decrease in Optical Gain | Initial Peel (gr-f/in) |
|---|---|---|---|---|
| 7 | 2.40 | 2.36 | 1.54 | 186 |
| 8 | 2.39 | 2.33 | 2.64 | 244 |
| 9 | 2.36 | 2.30 | 2.50 | 253 |
| 10 | 2.34 | 2.30 | 1.84 | 447 |
| 11 | 2.26 | 2.19 | 3.23 | 307 |

Examples Made with Optical Films C and D

Interleaving prismatic structures between prismatic structures with bonding portions represents one approach to improving axial brightness. In these cases, it is desired that the interleaved prismatic structures do not penetrate the adhesive layer. To maintain optical brightness of the laminate, the peak-to-peak offset height between the apex of the bonding portion and the apex of the interleaved prismatic structure may be designed such that the prismatic structure does not penetrate the adhesive. Film C represents one case where the offset height is not sufficiently large enough to prevent penetrating the prismatic structure into the adhesive, and the consequence is lower optical gain. Film D represents one case where the offset height is sufficiently large enough to prevent penetrating the prismatic structure into the adhesive; optical gain is retained. The preferred offset will be a function of the lamination process conditions, and these examples are not intended to limit the preferred range.

Preparation of Coating Solution:

A coating solution was prepared by mixing 679.42 g of Polyacrylate PSA B, 94.26 g of Uvacure 1500, 959.50 g of ethyl acetate, 277.20 g of methanol, 388.28 g of toluene, 3.61 g of Uvacure 1600, and 0.307 g of Additol ITX. This coating solution represents a solvent based adhesive that upon drying may be cured by exposure to actinic radiation to form an interpenetrating network (IPN). The reactive diluent, Uvacure 1500, has 2 oxirane moieties per molecule. This corresponds to a nominal molecular weight per unit functionality of 125.

A slurry was prepared by dispersing 20.67 g of MX300 polymeric beads in 187.35 g ethyl acetate. The slurry was added to the coating formulation to prepare a diffuse adhesive coating formulation. The composition of the dried adhesive is summarized as follows.

Adhesive Composition 12

| Component | Wt-% |
|---|---|
| Polyacrylate PSA B | 54.8 |
| Monomer (Uvacure 1500) | 35.9 |
| Photoinitiator (Uvacure 1600) | 1.4 |
| Photosensitizer (Additol ITX) | 0.12 |
| Polymeric Beads (MX300) | 7.9 |

Making of Optical Stack with Adhesive Composition 12 and Film C:

Coating solution was delivered as previously described at a flow rate of 59 g/min. The nominal thickness of the dried adhesive coating was 3.5 microns.

Adhesive coated Film A was laminated to the structured side of Film C as described previously with no modifications.

Making and Testing of Haze/Clarity

Adhesive Composition 12 was coated on PET according to the previously described process. Solution was delivered at a flow rate of 59 g/min. The nominal thickness of the dried adhesive coating was 3.5 microns.

Haze and clarity were determined for the cured, diffuse adhesive; the measured haze was 22.5 the measured clarity was 63.

Making of Optical Stack with Adhesive Composition 12 and Film D:

Coating solution was delivered as previously described at a flow rate of 67 g/min. The nominal thickness of the dried adhesive coating was 4 microns.

Adhesive coated Film A was laminated to the structured side of Film D as described previously with no modifications.

Making and Testing of Haze/Clarity Optical:

Adhesive Composition 12 was coated on PET according to the previous description. Solution was delivered at a flow rate of 67 g/min. The nominal thickness of the dried adhesive coating was 4.0 microns.

Haze and clarity were determined for the cured, diffuse adhesive; the measured haze was 18.9 the measured clarity was 64.

The initial optical and mechanical properties of optical stacks made with Adhesive Composition 12 and Films C or D are summarized as follows. The initial optical gain and peel force for the laminated optical stacks were measured according to the test methods detailed above.

Optical Stack Testing

| Optical Film | Initial Optical Gain | Initial Peel (gr-f/in) |
|---|---|---|
| Film C | 2.15 | 492 |
| Film D | 2.51 | 246 |

Since Adhesive Composition 12, used to prepare optical stacks with Films C and D, is very similar to Adhesive Composition 8, the aged optical gain would be very similar to results summarized for optical stacks made with Composition 8.

Adhesive Compositions 9 and 11 are similar to 4 and 3, respectively, and thus would be expected to have similar bulk material properties.

Example Exhibiting High Initial Peel

Alternative epoxide monomers may be used to improve the material properties of the cured adhesive and thereby increase the initial peel of the optical stack. One exemplary monomer is D.E.R. 736, a glycol epoxide material commercially available from Dow Chemical. The composition of the dried adhesive is summarized as follows.

Adhesive Composition 13

| Component | Wt-% |
|---|---|
| Polyacrylate PSA B | 54.8 |
| Monomer (Uvacure 1500) | 31.3 |
| Monomer (D.E.R. 736) | 4.5 |
| Photoinitiator (Uvacure 1600) | 1.4 |

-continued

| Component | Wt-% |
|---|---|
| Photosensitizer (Additol ITX) | 0.12 |
| Polymeric Beads (MX300) | 7.9 |

Making of Optical Stack with Adhesive Composition 13 and Film B:

Coating solution at 10% solids was delivered as previously described at a flow rate of 59 g/min. The nominal thickness of the dried adhesive coating was 3.5 microns.

Adhesive coated Film A was laminated to the structured side of Film B as described previously with no modifications.

Making and Testing of Haze/Clarity

Adhesive Composition 13 was coated on PET according to the previously described process. Solution was delivered at a flow rate of 59 g/min. The nominal thickness of the dried adhesive coating was 3.5 microns.

Haze and clarity were determined for the cured, diffuse adhesive; the measured haze was 24 and the measured clarity was 61.

The initial optical and mechanical properties of optical stack made with Adhesive Composition 13 and Film B are summarized as follows. The initial optical gain and peel force for the laminated optical stacks were measured according to the test methods detailed above.

Optical Stack Testing

| Adhesive Composition | Optical Film | Initial Optical Gain | Initial Peel (gr-f/in) |
|---|---|---|---|
| 13 | Film B | 2.37 | 645 |

What is claimed is:

1. An optical stack comprising a first optical film comprising a plurality of structures comprising an optically active portion designed primarily to provide optical gain and an optically in-active bonding portion disposed on a first surface wherein the optically in-active portion of the structures is bonded to a second optical film with a light-transmissive adhesive layer such that a portion of the structures penetrate the adhesive layer and a separation is provided between the adhesive layer and the first surface, wherein the adhesive layer comprises an interpenetrating network of the reaction product of a polyacrylate component and a polymerizable monomer having functional groups and a molecular weight less than 150 g/mole per functional group, the peel strength of the optical stack is at least 50 grams force/inch and the stack exhibits a decrease in optical gain of no greater than 5% when the optical stack is conditioned at 65° C. and 95% relative humidity for 200 hours.

2. The optical stack of claim 1 wherein the structures that penetrate the adhesive layer define an average penetration that increases by no more than 50% when the optical stack is conditioned at 65° C. and 95% relative humidity for 200 hours.

3. The optical stack of claim 1 wherein the adhesive layer has an elastic modulus ranging from 100 to 2000 MPa at 25° C.

4. The optical stack of claim 1 wherein at least a portion of the first optical film or structures comprise a bonding portion that penetrates the adhesive layer.

5. The optical stack of claim 4 wherein optically active portions of the structures do not penetrate the adhesive layer.

6. The optical stack of claim 1 wherein the structures comprise prism microstructures.

7. The optical stack of claim 6 wherein at least a portion of the prisms comprise a post extending from an apex of the prisms that functions as an optically non-active bonding portion.

8. The optical stack of claim 1 wherein the optical stack has an optical gain of at least 2.1.

9. The optical stack of claim 1 wherein the separation between the adhesive layer and the first surface provides an air interface.

10. The method of claim 1 wherein the substrate is an optical film or a release liner.

11. The optical film of claim 1 wherein the adhesive comprises about 35 wt-% to about 75 wt-% polyacrylate.

12. The optical film of claim 1 wherein the polyacrylate is a pressure sensitive adhesive comprising monomeric repeat units comprising branched C4-C12 alkyl groups.

13. The optical film of claim 1 wherein the polymerizable monomer is an epoxy component and the adhesive composition further comprises a photoactivated cationic initiator.

14. The optical film of claim 1 wherein the polymerizable monomer comprises at least three (meth)acrylate groups and the adhesive composition further comprises a free-radical photoinitiator.

15. The optical film of claim 1 wherein the adhesive further comprises a light transmissive filler.

* * * * *

UNITED STATES PATENT AND TRADEMARK OFFICE
CERTIFICATE OF CORRECTION

PATENT NO. : 9,791,603 B2
APPLICATION NO. : 14/005912
DATED : October 17, 2017
INVENTOR(S) : William Edmonds Page 1 of 1

It is certified that error appears in the above-identified patent and that said Letters Patent is hereby corrected as shown below:

In the Specification

Column 12
Line 18, Delete "terepthalate" and insert -- terephthalate --, therefor.
Line 37, Delete "primatic" and insert -- prismatic --, therefor.

Column 21
Line 51, Delete "a" and insert -- as --, therefor.
Line 55, Delete "a" and insert -- as --, therefor.

Column 30
Line 8, Delete "knotched" and insert -- notched --, therefor.
Line 9, Delete "knotched" and insert -- notched --, therefor.

In the Claims

Column 38
Line 33, Delete "method" and insert -- optical stack --, therefor.

Signed and Sealed this
Twelfth Day of June, 2018

Andrei Iancu
*Director of the United States Patent and Trademark Office*